(12) United States Patent
Stuhec

(10) Patent No.: US 7,937,408 B2
(45) Date of Patent: May 3, 2011

(54) LAYOUT INFORMATION FOR DATA ELEMENT

(75) Inventor: Gunther Stuhec, Walldorf (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 12/748,307

(22) Filed: Mar. 26, 2010

(65) Prior Publication Data

US 2010/0257441 A1 Oct. 7, 2010

Related U.S. Application Data

(62) Division of application No. 11/618,529, filed on Dec. 29, 2006, now Pat. No. 7,716,164.

(51) Int. Cl.
*G06F 17/00* (2006.01)
(52) U.S. Cl. ........ 707/791; 707/793; 707/795; 707/796; 707/999.103; 707/999.104
(58) Field of Classification Search .................. 707/791, 707/793, 795, 796, 999.103, 999.104
See application file for complete search history.

(56) References Cited

U.S. PATENT DOCUMENTS

| | | | |
|---|---|---|---|
| 7,080,083 | B2 | 7/2006 | Kim et al. |
| 7,313,756 | B2 | 12/2007 | Panditharadhya et al. |
| 7,373,595 | B2 | 5/2008 | Jones et al. |
| 2002/0147748 | A1 | 10/2002 | Huang et al. |
| 2003/0149934 | A1 | 8/2003 | Worden |
| 2004/0162871 | A1 | 8/2004 | Pabla et al. |
| 2006/0184539 | A1* | 8/2006 | Blake et al. ................ 707/10 |

FOREIGN PATENT DOCUMENTS

EP 1 424 643 A1 6/2004

OTHER PUBLICATIONS

"Adobe LiveCycle Designer FAQ" *Adobe Systems Incorporated*, 3 pages, 2004.
"Core Components Technical Specification V2.01—Part 8 of the ebXML Framework" for UN/CEFACT, Nov. 15, 2003, pp. 1-113.
XForms 1.1, W3C Working Draft Nov. 15, 2004, Obtained from the Internet at http://www.w3.org/TR/2004/WD-xforms11-20041115, on Dec. 6, 2004, 26 pages.
XML Schema, W3C, Obtained from the Internet http://www.w3.org/XML/Schema on Jan. 3, 2005, 16 pages.
XForms—The Next Generation of Web Forms, W3C, obtained from the Internet at http://www.w3.org/MarkUp/Forms, on Jan. 3, 2005, 11 pages.

(Continued)

*Primary Examiner* — Sana Al-Hashemi
(74) *Attorney, Agent, or Firm* — Fish & Richardson P.C.

(57) ABSTRACT

Providing layout information includes assigning at least a first context value to layout information for a data element. The layout information is configured for use in displaying an instance of the data element in a graphical user interface. The method includes storing the layout information and the first context value in a schema definition for the data element. Providing display of data using layout information includes receiving a context definition. A data element is identified using the received context definition. A schema definition for the data element includes layout information with at least a first context value assigned thereto. The method further includes providing, using the layout information, an instance of the identified data element for display in a graphical user interface.

19 Claims, 31 Drawing Sheets

OTHER PUBLICATIONS

XML Path Language (XPath) Version 1.0—W3C Recommendation Nov. 16, 1999, W3C, Obtained from the Internet at http://www.w3.org/TR/xpath, on Jan. 3, 2005, 37 pages.

InfoPath 2003 Product Overview, Microsoft Office Online, [Retrieved on Jan. 4, 2005] Retrieved from the Internet: <URL: http://www.microsoft.com/office/infopath/prodinfo/overview.mspx,> (2 pages).

Davis, J., *Context Tailor: Towards a Programming Model for Context-Aware Computing*, International Middleware Conference Workshop Proceedings—Middleware for Pervasive and Ad Hoc Computing, Jun. 16-20, 2003, Rio de Janeiro, Brazil, 68-75, 2003.

Oasis ebXML Registry TC[online], Oasis, 2005 [retrieved on Mar. 23, 2005]. Retrieved from the Internet: <URL: http://www.oasis-open.org/committees/tc_home.php?wg_abbrev=regrep>.

GoXML Registry [online], Xenos, 2002 [retrieved on Mar. 23, 2005]. Retrieved from the Internet: <URL: http://www.xmlglobal.com/solutions/prod_goxml_registry.asp>.

The Company of The Open Standard Solutions [online], ebXMLsoft Inc., 2001-2004 [retrieved on Mar. 23, 2005]. Retrieved from the Internet: <URL: http://www.ebsmlsoft.com/>.

Project: ebXML Registry/Repository: Summary [online], SourceForge.net, 2005 [retrieved on Mar. 23, 2005]. Retrieved from the Internet: <URL: http://sourceforge.net/projects/ebsmlrr>.

AnHai Doan, Jayant Madhaven, Pedro Domingos, and Alon Halevy, "Learning to Map between Ontologies on the Semantic Web," May 2002, *Proceedings of the 11th International World Wide Web Conference*, pp. 662-673.

L. M. Haas, R. J. Miller, B. Niswonger, M. Tork Roth, P. M. Schwarz, and E. L. Wimmers, "Transforming Heterogeneous Data with Database Middleware: Beyond Integration," Copyright 1997, *Computer Society Technical Committee on Data Engineering*, pp. 1-6.

Hong-Hai Do and Erhard Rahm, "COMA—A system for flexible combination of schema matching approaches," Aug. 2002, *Proc. 28th Intl. Conference on Very Large Databases (VLDB)*, Hongkong, pp. 1-12.

Hong-Hai Do, Sergey Melnik, and Erhard Rahm, "Comparison of Schema Matching Evaluations," Oct. 2002, *Proc. GI-Workshop "Web and Databases"*, Erfurt, pp. 1-15.

Jayant Madhavan, Philip A. Bernstein, and Erhard Rahm, "Generic Schema Matching with Cupid," 2001, *Proceedings of the 27th VLDB Conference*, pp. 49-58.

Jayant Madhaven, Philip A. Bernstein, and Erhard Rahm, "Generic Schema Matching with Cupid," Aug. 2001, *Microsoft Research*, MSR-TR-2001-58, pp. 1-15.

Sergey Melnik, Hector Garcia-Molina, and Erhard Rahm, "Similarity Flooding: A Versatile Graph Matching Algorithm and its Application to Schema Matching," 2002, *Proc. 18th Int'l Conf. on Data Engineering (ICDE)*, pp. 1-12.

Lucian Popa, Yannis Velegrakis, Renee J. Miller, Mauricio A. Hernandez, Ronald Fagin, "Translating Web Data," 2002, *The Eleventh International WWW Conference*, pp. 1-12.

Hong Su, Harumi, Kuno, and Elke A. Rundensteiner, "Automating the Transformation of XML Documents," 2001, *The ACM Digital Library*, pp. 68-75.

http://www.flexisoftsolutions.com/Products/SM2004/SM2004.aspx—*FlexiSoft Solutions*, obtained from the Internet on Jun. 24, 2005, 4 pages.

http://ww.notes.queensu.ca/uisadmin.nsf/579a5e3cc0e046c085256833007715cc/$FILE/queries_guide.pdf—BI/Query Queries Guide, *Hummingbird, Ltd.*, obtained from the Internet on Jul. 18, 2005, 6 pages.

"Final Committee Draft ISO/IEC FCD—Information technology—Metadata registries (MDR)—Part 5: Naming and identification principles"*ISO/IEC*, documented dated Jan. 8, 2004, 26 pages.

Goyal, "An XML Schema Naming Assister for Elements and Types," *National Institute of Standards and Technology*, document obtained at http://www.mel.nist.gov/msidlibrary/doc/NISTIR7143.pdf on Jun. 24, 2005, 12 pages.

"Information technology—Metadata registries (MDR)—Part 4: Formulation of data definitions," *ISO/IEC*, document dated Jul. 15, 2004, 16 pages.

"Information technology—Specification and standardization of data elements—Part 5: Naming and identification principles for data elements," *ISO/IEC*, document dated Dec. 1, 1995, 20 pages.

GEFEG EDIFIX, "EDIFIX Functions," [online], Xenos, 2002 [retrieved on Nov. 30, 2005]. <URL: http://www.gefeg.com/en/edifix/fx_functions.htm>.

"Information technology—Metadata Registries (MDR)—Part 1: Framework" International Standard ISO/IEC 11179-1; Sep. 15, 2004; (32 pages).

"Information technology—Metadata Registries (MDR)—Part 2: Classification"; International Standard ISO/IEC 11179-2; Nov. 15, 2005 (16 pages).

"Information Technology—Metadata Registries (MDR)—Part 3: Registry Metamodel and Basic Attributes"; International Standard ISO/IEC 11179-3; Feb. 15, 2003 (108 pages).

EP Office Action dated Apr. 2, 2009, Appln No. 05/787 252.5.

P. Garvey, B. French (2003), "Generating User Interfaces From Composite Schemas", Proceedings of XML 2003, Philadelphia, Pennsylvania, Dec. 2003.

P. Lay, S. Luttringhaus-Kappel (2004), "Transforming XML Schemas into Java Swing Guls", GI Jahrestagung (1) Sep. 20-24, 2004.

"Novell Xforms Strategy", White Papre, Feb. 26, 2003, http://www.nmpub.com/eforms/onfolio-files/novell%20xforms%20strategy.pdf.

XForms 1.0-W3C Recommendation Oct. 14, 2003, edited by M. Dubinko et al., http://www.w3.org/tr/2003/REC-xforms-20031014/.

USPTO Non-Final Office Action in U.S. Appl. No. 11/063,000, mailed Oct. 9, 2008, 22 pages.

Fish & Richardson P.C., Amendment in Reply to Action dated Oct. 9, 2008 in U.S. Appl. No. 11/063,000, filed Jan. 5, 2009, 12 pages.

USPTO Final Office Action in U.S. Appl. No. 11/063,000, mailed Apr. 17, 2009, 18 pages.

Fish & Richardson P.C., Request for Continued Examination with Amendment in Reply to Action dated Apr. 17, 2009 in U.S. Appl. No. 11/063,000, filed Jun. 19, 2009, 9 pages.

USPTO Non-Final Office Action in U.S. Appl. No. 11/063,000, mailed Sep. 3, 2009, 17 pages.

Fish & Richardson P.C., Amendment in Reply to Action dated Sep. 3, 2009 in U.S. Appl. No. 11/063,000, filed Nov. 25, 2009, 12 pages.

USPTO Final Office Action in U.S. Appl. No. 11/063,000, mailed Apr. 14, 2010, 21 pages.

Fish & Richardson P.C., Amendment in Reply to Action dated Apr. 14, 2010 in U.S. Appl. No. 11/063,000, filed Jun. 14, 2010, 9 pages.

Ali Mesbah, "Web-based XML Editing with W3C XML Schema and XSLT", published: Apr. 30, 2003, pp. Document A (pp. 1-6), Document B (pp. 1-6).

Brown, P,: Information Architecture with XML, A Management Strategy, John Wiley & Sons, Hoboken 2003 (9 pages).

Non-Final Office Action in U.S. Appl. No. 11/618,529 mailed Dec. 8, 2008, 9 pages.

Fish & Richardson, Response to Non-Final Office Action in U.S. Appl. No. 11/618,529 mailed Mar. 4, 2009, 12 pages.

Final Office Action in U.S. Appl. No. 11/618,529 mailed Jun. 3, 2009, 8 pages.

Fish & Richardson, Response to Final Office Action in U.S. Appl. No. 11/618,529 mailed Jul. 22, 2009, 10 pages.

Non-Final Office Action in U.S. Appl. No. 11/618,529 mailed Aug. 3, 2009, 9 pages.

Fish & Richardson, Response to Non-Final Office Action in U.S. Appl. No. 11/618,529 mailed Oct. 28, 2009, 9 pages.

Kessler, "A Schema Based Approach to HTML Authoring", published Aug. 2000 [Retrieved on Sep. 26, 2008] Retrieved from the Internet <URL: http://web.archive.org/web/20000823145832/http://www.w3.org/Conferences/WWW4/Papers2/145/>, pp. 1-17.

\* cited by examiner

202
```
<xsd:simpleType name="CurrencyCodeType">
  <xsd:annotation>
    <xsd:documentation xml:lang="en">
      <ccts:UniqueIdentifier/>
      <ccts:CategoryCode>QDT</ccts:CategoryCode>
      <ccts:DictionaryEntryName>Currency_Code. Type</ccts:DictionaryEntryName>
      <ccts:Definition>This type represents the currency.</ccts:Definition>
      <ccts:ObjectClassQualifierName>Currency</ccts:ObjectClassQualifierName>
      <ccts:ObjectClassTermName>Code</ccts:ObjectClassTermName>
      <ccts:PropertyTermName>Type</ccts:PropertyTermName>
    </xsd:documentation>
500 <xsd:appinfo>
      <xforms:select1 ref="./external/iso4217:CurrencyCodeContentType"
502     appearance="minimal">
        <xforms:label ref="concat(./xsd:element/xsd:annotation/xsd:documentation/
          ccts:PropertyQualifierTermName, '', ./xsd:element/xsd:annotation/
          xsd:documentation/ccts:PropertyTermName)"/>
      </xforms:select1>
    </xsd:appinfo>
  </xsd:annotation>
  <xsd:restriction base="xsd:string"/>
</xsd:simpleType>
```
204

FIG. 5B

```
202
    <xsd:schema targetNamespace="urn:unece:uncefact:...">
        <xsd:simpleType name="CurrencyCodeContentType">
            <xsd:annotation>
                <xsd:documentation/>
                <xsd:appinfo>
510 ─────<xforms:item>
                    <xforms:label ref="./xsd:simpleType/xsd:restriction/xsd:enumeration/@value"/>    }
514 ─────     <xforms:value ref="./xsd:simpleType/xsd:restriction/xsd:enumeration/@value"/>    } 204
512 ─────</xforms:item>
                </xsd:appinfo>
            </xsd:annotation>
            <xsd:restriction base="xsd:token">     ─── 506
                <xsd:enumeration value="ADP">
                    <xsd:annotation>
                        <xsd:documentation source="code" xml:lang="en">
                            <ccts:CodeName>Andorran Peseta</ccts:CodeName>
                        </xsd:documentation>
                    </xsd:annotation>
                </xsd:enumeration>                     ─── 506
                <xsd:enumeration value="AED">
                    <xsd:annotation>
                        <xsd:documentation source="code" xml:lang="en">
                            <ccts:CodeName>UAE Dirham</ccts:CodeName>
                        </xsd:documentation>
                    </xsd:annotation>
                </xsd:enumeration>                     ─── 506
                <xsd:enumeration value="AFA">
                    <xsd:annotation>
                        <xsd:documentation source="code" xml:lang="en">
                            <ccts:CodeName>Afghani</ccts:CodeName>
                        </xsd:documentation>
                    </xsd:annotation>
                </xsd:enumeration>
508 ─── ...
            </xsd:restriction>
        </xsd:simpleType>
    </xsd:schema>
```

```
<xsd:complexType name="FlightDetails">
  <xsd:annotation>
    <xsd:documentation/>
    <xsd:appinfo>
      <table cellspacing="0" cellpadding="2" border="0" class="box">
        <tr>
          <th colspan="11" class="boxheader">
            <xforms:label ref="concat(./xsd:element/xsd:annotation/xsd:documentation/
              ccts:PropertyQualifierTermName, ' ', ./xsd:element/xsd:annotation/
              xsd:documentation/ccts:PropertyTermName)"/>
          </th>
        </tr>
        <tr>
          <td><xforms:input ref="./xsd:complexType/xsd:sequence/
            xsd:element[@name='Date']"/></td>          }1220
          <td><xforms:input ref="./xsd:complexType/xsd:sequence/
            xsd:element[@name='AircraftTypeCode']"/></td>
          <td style="width:5px;border-right:1px solid #CCCCCC;"> </td>
          <td style="width:5px;"> </td>
          <td>
            <xforms:input ref="./xsd:complexType/xsd:sequence/
              xsd:element[@name='EconomyClassMaximumSeatsValue']"/>
          </td>
          <td style="width:5px;border-right:1px solid #CCCCCC;"> </td>
          <td style="width:5px;"> </td>
          <td>
            <xforms:input ref="./xsd:complexType/xsd:sequence/
              xsd:element[@name='BusinessClassMaximumSeatsValue']"/>
          </td>
          <td style="width:5px;border-right:1px solid #CCCCCC;"> </td>
          <td style="width:5px;"> </td>
          <td>
            <xforms:input ref="./xsd:complexType/xsd:sequence/
              xsd:element[@name='FirstClassMaximumSeatsValue']"/>
          </td>
        </tr>
        <tr>
          <td colspan="2">
            <xforms:input ref="./xsd:complexType/xsd:sequence/
              xsd:element[@name='AirfareAmount']"/>
          </td>
          <td style="width:5px;border-right:1px solid #CCCCCC;"> </td>
          <td style="width:5px;"> </td>
          <td>
            <xforms:input ref="./xsd:complexType/
              xsd:sequence/xsd:element[@name='EconomyClassOccupiedSeatsValue']"/>
          </td>
          <td style="width:5px;border-right:1px solid #CCCCCC;"> </td>
          <td style="width:5px;"> </td>
          <td>
            <xforms:input ref="./xsd:complexType/xsd:sequence/
              xsd:element[@name='BusinessClassOccupiedSeatsValue']"/>
          </td>
```

1230 points to the `<td><xforms:input ref="./xsd:complexType/xsd:sequence/xsd:element[@name='Date']"/></td>` line.

```
                    <td style="width:5px;border-right:1px solid #CCCCCC;"> </td>
                    <td style="width:5px;"> </td>
                    <td>
                      <xforms:input ref="./xsd:complexType/xsd:sequence/
                         xsd:element[@name='FirstClassOccupiedSeatsValue']"/>
                    </td>
                  </tr>
                </table>
              </xsd:appinfo>
            </xsd:annotation>
            <xsd:sequence>
              <xsd:element name="Date" type="sfly:DateType">
                <xsd:annotation>
                  <xsd:documentation xml:lang="en">
                    <ccts:Description>This is the date of the flight.</ccts:Description>
                    <ccts:RepresentationTerm>Date</ccts:RepresentationTerm>
                    <ccts:ObjectClassTermName>Flight</ccts:ObjectClassTermName>
                    <ccts:PropertyTermName>Date</ccts:PropertyTermName>
                    <ccts:DictionaryEntryName>Flight. Date. Date</ccts:DictionaryEntryName>
                  </xsd:documentation>
                </xsd:annotation>
              </xsd:element>
              <xsd:element name="AirfareAmount" type="sfly:AmountType">
                <xsd:annotation>
                  <xsd:documentation xml:lang="en">
                    <ccts:Description>This is the amount of the airfare of a flight.
                      </ccts:Description>
                    <ccts:DictionaryEntryName>Flight. Airfare. Amount</ccts:DictionaryEntryName>
                    <ccts:PropertyTermName>Amount</ccts:PropertyTermName>
                    <ccts:PropertyQualifierTermName>Airfare</ccts:PropertyQualifierTermName>
                    <ccts:RepresentationTerm>Amount</ccts:RepresentationTerm>
                    <ccts:ObjectClassTermName>Flight</ccts:ObjectClassTermName>
                  </xsd:documentation>
                </xsd:annotation>
              </xsd:element>
              <xsd:element name="AircraftTypeCode" type="sfly:AircraftTypeCodeType">
                <xsd:annotation>
                  <xsd:documentation xml:lang="en">
                    <ccts:Description>This is the type code of the aircraft
                      for the flight.</ccts:Description>
                    <ccts:ObjectClassTermName>Flight</ccts:ObjectClassTermName>
                    <ccts:PropertyTermName>Type</ccts:PropertyTermName>
                    <ccts:PropertyQualifierTermName>Aircraft</ccts:PropertyQualifierTermName>
                    <ccts:DictionaryEntryName>Flight. Aircraft_. Type. Code
                      </ccts:DictionaryEntryName>
                    <ccts:RepresentationTerm>Code</ccts:RepresentationTerm>
                  </xsd:documentation>
                </xsd:annotation>
              </xsd:element>
              <xsd:element name="EconomyClassMaximumSeatsValue" type="sfly:ValueType"
                 minOccurs="0">
                <xsd:annotation>
                  <xsd:documentation xml:lang="en">
```

```xml
        <ccts:Description>This is the value of the maximum seats in the economy
            class of a flight.</ccts:Description>
        <ccts:DictionaryEntryName>Flight. Economy Class_ Maximum_
            Seats. Value</ccts:DictionaryEntryName>
        <ccts:PropertyQualifierTermName>Economy Class
            Maximum</ccts:PropertyQualifierTermName>
        <ccts:RepresentationTerm>Value</ccts:RepresentationTerm>
        <ccts:PropertyTermName>Seats</ccts:PropertyTermName>
        <ccts:ObjectClassTermName>Flight</ccts:ObjectClassTermName>
      </xsd:documentation>
    </xsd:annotation>
</xsd:element>
<xsd:element name="EconomyClassOccupiedSeatsValue" type="sfly:ValueType"
    minOccurs="0">
    <xsd:annotation>
      <xsd:documentation xml:lang="en">
        <ccts:Description>This is the value of the occupied seats in the economy
            class of a flight.</ccts:Description>
        <ccts:ObjectClassTermName>Flight</ccts:ObjectClassTermName>
        <ccts:RepresentationTerm>Value</ccts:RepresentationTerm>
        <ccts:DictionaryEntryName>Flight. Economy Class_ Occupied_
            Seats. Value</ccts:DictionaryEntryName>
        <ccts:PropertyQualifierTermName>Economy Class
            Occupied</ccts:PropertyQualifierTermName>
        <ccts:PropertyTermName>Seats</ccts:PropertyTermName>
      </xsd:documentation>
    </xsd:annotation>
</xsd:element>
<xsd:element name="BusinessClassMaximumSeatsValue" type="sfly:ValueType"
    minOccurs="0">
    <xsd:annotation>
      <xsd:documentation xml:lang="en">
        <ccts:Description>This is the value of the maximum seats in the business class
            of a flight.</ccts:Description>
        <ccts:ObjectClassTermName>Flight</ccts:ObjectClassTermName>
        <ccts:DictionaryEntryName>Flight. Business Class_ Maximum_ Seats.
            Value</ccts:DictionaryEntryName>
        <ccts:PropertyTermName>Seats</ccts:PropertyTermName>
        <ccts:RepresentationTerm>Value</ccts:RepresentationTerm>
        <ccts:PropertyQualifierTermName>Business Class
            Maximum</ccts:PropertyQualifierTermName>
      </xsd:documentation>
    </xsd:annotation>
</xsd:element>
<xsd:element name="BusinessClassOccupiedSeatsValue" type="sfly:ValueType"
    minOccurs="0">
    <xsd:annotation>
      <xsd:documentation xml:lang="en">
        <ccts:Description>This is the value of the occupied seats in the business
            class of a flight.</ccts:Description>
        <ccts:PropertyQualifierTermName>Business Class Occupied
            </ccts:PropertyQualifierTermName>
        <ccts:DictionaryEntryName>Flight. Business Class_ Occupied_ Seats. Value
```

FIG. 12C

```
1200
            </ccts:DictionaryEntryName>
          <ccts:RepresentationTerm>Value</ccts:RepresentationTerm>
          <ccts:PropertyQualifierTermName>Occupied</ccts:PropertyQualifierTermName>
          <ccts:ObjectClassTermName>Flight</ccts:ObjectClassTermName>
          <ccts:PropertyTermName>Seats</ccts:PropertyTermName>
        </xsd:documentation>
      </xsd:annotation>
    </xsd:element>
    <xsd:element name="FirstClassMaximumSeatsValue" type="sfly:ValueType" minOccurs="0">
      <xsd:annotation>
        <xsd:documentation xml:lang="en">
          <ccts:Description>This is the value of the maximum seats in the first class
            of a flight.</ccts:Description>
          <ccts:PropertyQualifierTermName>First Class Maximum
            </ccts:PropertyQualifierTermName>
          <ccts:RepresentationTerm>Value</ccts:RepresentationTerm>
          <ccts:ObjectClassTermName>Flight</ccts:ObjectClassTermName>
          <ccts:PropertyTermName>Seats</ccts:PropertyTermName>
          <ccts:DictionaryEntryName>Flight. First Class_ Maximum_ Seats. Value
            </ccts:DictionaryEntryName>
        </xsd:documentation>
      </xsd:annotation>
    </xsd:element>
    <xsd:element name="FirstClassOccupiedSeatsValue" type="sfly:ValueType"
      minOccurs="0">
      <xsd:annotation>
        <xsd:documentation xml:lang="en">
          <ccts:PropertyQualifierTermName>First Class Occupied
            </ccts:PropertyQualifierTermName>
          <ccts:RepresentationTerm>Value</ccts:RepresentationTerm>
          <ccts:PropertyQualifierTermName>Occupied</ccts:PropertyQualifierTermName>
          <ccts:PropertyTermName>Seats</ccts:PropertyTermName>
          <ccts:DictionaryEntryName>Flight. First Class_ Occupied_ Seats. Value
            </ccts:DictionaryEntryName>
          <ccts:ObjectClassTermName>Flight</ccts:ObjectClassTermName>
        </xsd:documentation>
      </xsd:annotation>
    </xsd:element>
  </xsd:sequence>
</xsd:complexType>
```

```
<xsd:element name="Date" type="sfly:DateType">
    <xsd:annotation>
        <xsd:documentation xml:lang="en">
            <ccts:Description>This is the date of the flight.</ccts:Description>
            <ccts:RepresentationTerm>Date</ccts:RepresentationTerm>
            <ccts:ObjectClassTermName>Flight</ccts:ObjectClassTermName>
            <ccts:PropertyTermName>Date</ccts:PropertyTermName>
            <ccts:DictionaryEntryName>Flight. Date. Date</ccts:DictionaryEntryName>
        </xsd:documentation>
    </xsd:annotation>
</xsd:element>
```

```
<xsd:simpleType name="DateType">
    <xsd:annotation>
        <xsd:documentation xml:lang="en">
            <ccts:CategoryCode>RT</ccts:CategoryCode>
            <ccts:DictionaryEntryName>Date_ Date Time. Type</ccts:DictionaryEntryName>
            <ccts:Definition>DateType represents one calendar day according the
                Gregorian calendar.</ccts:Definition>
            <ccts:ObjectClassQualifierName ID="1">Date</ccts:ObjectClassQualifierName>
            <ccts:ObjectClassTermName>Date Time</ccts:ObjectClassTermName>
            <ccts:PropertyTermName>Type</ccts:PropertyTermName>
        </xsd:documentation>
        <xsd:appinfo>                    ┌─1260
1270 ──<xforms:input ref=" ">
            <xforms:label ref=" concat (./xsd:element/xsd:annotation/xsd:documetation/
                ccts:PropertyQualifierTermName, ' ', ./xsd:element/xsd:annotation/
                xsd:documentation/ccts:PropertyTermName)"/>
            ┌─<xforms:hint ref="./xsd:simpleType/xsd:annotation/xsd:documentation/
1280 ──        ccts:Definition"/>
        </xforms:input>
        </xsd:appinfo>
    </xsd:annotation>
    <xsd:restriction base="xsd:date"/>
</xsd:simpleType>
```
} 1250

FIG. 12F

```
<XSD:SIMPLETYPE NAME="CURRENCYCODETYPE">
  <XSD:ANNOTATION>
    <XSD:DOCUMENTATION XML:LANG="EN">
      <CCTS:UNIQUEIDENTIFIER/>
      <CCTS:CATEGORYCODE>QDT</CCTS:CATEGORYCODE>
      <CCTS:DICTIONARYENTRYNAME>CURRENCY_CODE.TYPE</CCTS:DICTIONARYENTRYNAME>
      <CCTS:DEFINITION>THIS TYPE REPRESENTS THE CURRENCY.</CCTS:DEFINITION>
      <CCTS:OBJECTCLASSQUALIFIERNAME>CURRENCY</CCTS:OBJECTCLASSQUALIFIERNAME>
      <CCTS:OBJECTCLASSTERMNAME>CODE</CCTS:OBJECTCLASSTERMNAME>
      <CCTS:PROPERTYTERMNAME>TYPE</CCTS:PROPERTYTERMNAME>
    </XSD:DOCUMENTATION>
    <XSD:APPINFO SOURCE="HTTP://WWW.SAP.COM/GLOBALBUSINESSCONTEXT">
      <CDA:BUSINESSCONTEXT>
        <CDA:BUSINESSPROCESSCONTEXTCATEGORY>
          <CDA:BUSINESSTRANSACTIONDOCUMENTCODE>0062</CDA:BUSINESSTRANSACTIONDOCUMENTCODE> <!-- PURCHASINGCONTRACTUSEREQUEST -->
          <CDA:BUSINESSTRANSACTIONDOCUMENTCODE>0081</CDA:BUSINESSTRANSACTIONDOCUMENTCODE> <!-- CATALOGUEPUBLICATIONREQUEST -->
          <CDA:BUSINESSTRANSACTIONDOCUMENTCODE>0101</CDA:BUSINESSTRANSACTIONDOCUMENTCODE> <!-- PURCHASEORDERREQUEST -->
          <CDA:BUSINESSTRANSACTIONDOCUMENTCODE>0120</CDA:BUSINESSTRANSACTIONDOCUMENTCODE> <!-- PURCHASEORDERINFORMATION -->
        </CDA:BUSINESSPROCESSCONTEXTCATEGORY>
        <CDA:INDUSTRYCLASSIFICATIONCONTEXTCATEGORY>
          <CDA:INDUSTRYTYPECODE>X</CDA:INDUSTRYTYPECODE> <!-- AEROSPACE -->
          <CDA:INDUSTRYTYPECODE>W</CDA:INDUSTRYTYPECODE> <!-- DEFENCE -->
        </CDA:INDUSTRYCLASSIFICATIONCONTEXTCATEGORY>
        <CDA:GEOPOLITICALCONTEXTCATEGORY>
          <CDA:COUNTRYCODE>D</CDA:COUNTRYCODE> <!-- GERMANY -->
          <CDA:COUNTRYCODE>U</CDA:COUNTRYCODE> <!-- USA -->
        </CDA:GEOPOLITICALCONTEXTCATEGORY>
      </CDA:BUSINESSCONTEXT>
    </XSD:APPINFO>
```

LAYOUT INFORMATION FOR DATA ELEMENT

CROSS-REFERENCE TO RELATED APPLICATIONS

This application is a divisional application of, and claims priority to, commonly owned U.S. patent application Ser. No. 11/618,529, entitled Layout Information for Data Element, filed Dec. 29, 2006.

TECHNICAL FIELD

The description relates to layout information to be used in displaying a data element.

BACKGROUND

Many aspects of electronic communication, and in particular electronic commerce, is based on business documents that parties can exchange over a computer connection. A big problem in current e-Business is the variety in structure and description of business information and business documents. The absence of uniform and standardized methods for the common representation of the structure and semantics of business data led to today's situation where there is an increasing growth of different representations of electronic business information and documents. Currently it is not possible to exchange business documents electronically between two business partners without previous coordination and manual mapping between different document structures and semantics. A world-wide accepted syntax for representation exists with extensible markup language (XML), but this does not solve the problem of non-uniform semantics and structure.

Some business documents are based on reusable building blocks that define the semantics of the document data. An example of a standard that defines such building blocks is the electronic business UN/CEFACT Core Elements Technical Specification issued by the United Nations Centre for Trade Facilitation and Electronic Business, which specification is hereafter referred to as CCTS. The CCTS is the first standard which combines all necessary aspects for human legibility and automatic machine processing so that an integrated interoperability can be guaranteed. The CCTS based building blocks are syntax free and very flexible, because they are based on a modular concept. Business information can be assembled for all demands by reusable building blocks. "Syntax free" means that these building blocks can be generated in arbitrary representations, like XML, ABAP Objects or Java classes. However, the semantics described by the CCTS do not change. This guarantees one general naming convention for the unambiguous composition of semantic information. This mechanism is comparable with the grammar and words of a naturally-spoken language, because a naturally-spoken language can also be represented in many different ways (by writing or by speech), and the semantics are always the same.

The layout and form information for the visual presentation of current business documents is typically described in an external script file. The script file is used when the document is printed, or displayed in a graphical user interface (GUI). Examples of these files include extensible stylesheet language transformation (XSLT) files, XSL formatting object (XSL:FO) files or extensible data processor (XDP) files. Such files are separate from, and describe layout properties of, the business document, such as a purchase order or an invoice.

One disadvantage with the use of external script files is that there is no tight conjunction of the reusable building blocks the XML schema (like address and location of a business document) and the reusable parts of the layout information. If a new document is to be assembled using an XML schema, complete new layout information must be developed using a script language. Furthermore, current browsers understand only the layout information and do not handle the semantics and structure of reusable building blocks based on XML schemas. Such browsers do not perform a validation of incoming XML based business documents, and do not generate XML based building blocks in a very generic way so that everyone (humans and applications) can understand the business documents.

SUMMARY

In a first general aspect, a computer-implemented method of providing layout information includes assigning at least a first context value to layout information for a data element. The layout information is configured for use in displaying an instance of the data element in a graphical user interface. The method includes storing the layout information and the first context value in a schema definition for the data element.

Implementations can include any, all or none of the following features. A plurality of context values can be assigned to the layout information, and the method can further include restricting the data element for a specific use that involves fewer than all of the context values. The data element can also be associated with another layout information, and the method can further include assigning at least a second context value to the other layout information and storing also the other layout information and the second context value in the schema definition. The schema definition can include a structural definition for the data element, and the method can further include assigning at least a second context value to the structural definition. The first context value can belong to one of a plurality of context categories, and the first context value can be assigned such that the layout information is valid for contexts that have the first context value in the corresponding context category and any value in the other context categories. The method can further include providing a field name and configuring the layout information such that the field name, and not a preexisting name of the data element, will be presented in the instance of the data element.

In a second general aspect, a computer-implemented method of providing display of data using layout information includes receiving a context definition. A data element is identified using the received context definition. A schema definition for the data element includes layout information with at least a first context value assigned thereto. The method further includes providing, using the layout information, an instance of the identified data element for display in a graphical user interface.

Implementations can include any, all or none of the following features. The data element can be identified based on the context definition comprising the first context value. The data element can also be associated with another layout information that has a second context value assigned thereto, and the data element can be identified based on the context definition not comprising the second context value. The schema definition can include a structural definition for the data element that has at least a second context value assigned thereto, and the data element can be identified based on the context definition comprising the first and second context values. The at least one first context value can be a subset of the at least one second context value. The first context value can belong to one of a plurality of predefined context categories, and the first context value can be assigned such that the layout information is valid for contexts that have the first context value in the corresponding context category and any value in the other context categories. The schema definition can be incorporated into an electronic document in response to identifying the data element, and providing the instance of the data element can include displaying the electronic document.

Implementations can provide any, all or none of the following advantages. Providing improved handling and use of layout information. Providing an improved schema definition for a data element. Providing improved message handling. Providing increased flexibility in the selection of layout for semantically categorized data. Providing higher reusability. Processing and using different business data in user interfaces with less integration efforts.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIGS. 5A-E show a schema definition for a second data element that refers to a code list;

FIGS. 12A-F show schema definitions.

Like reference numerals in the various drawings indicate like elements.

DETAILED DESCRIPTION

Figure 1:
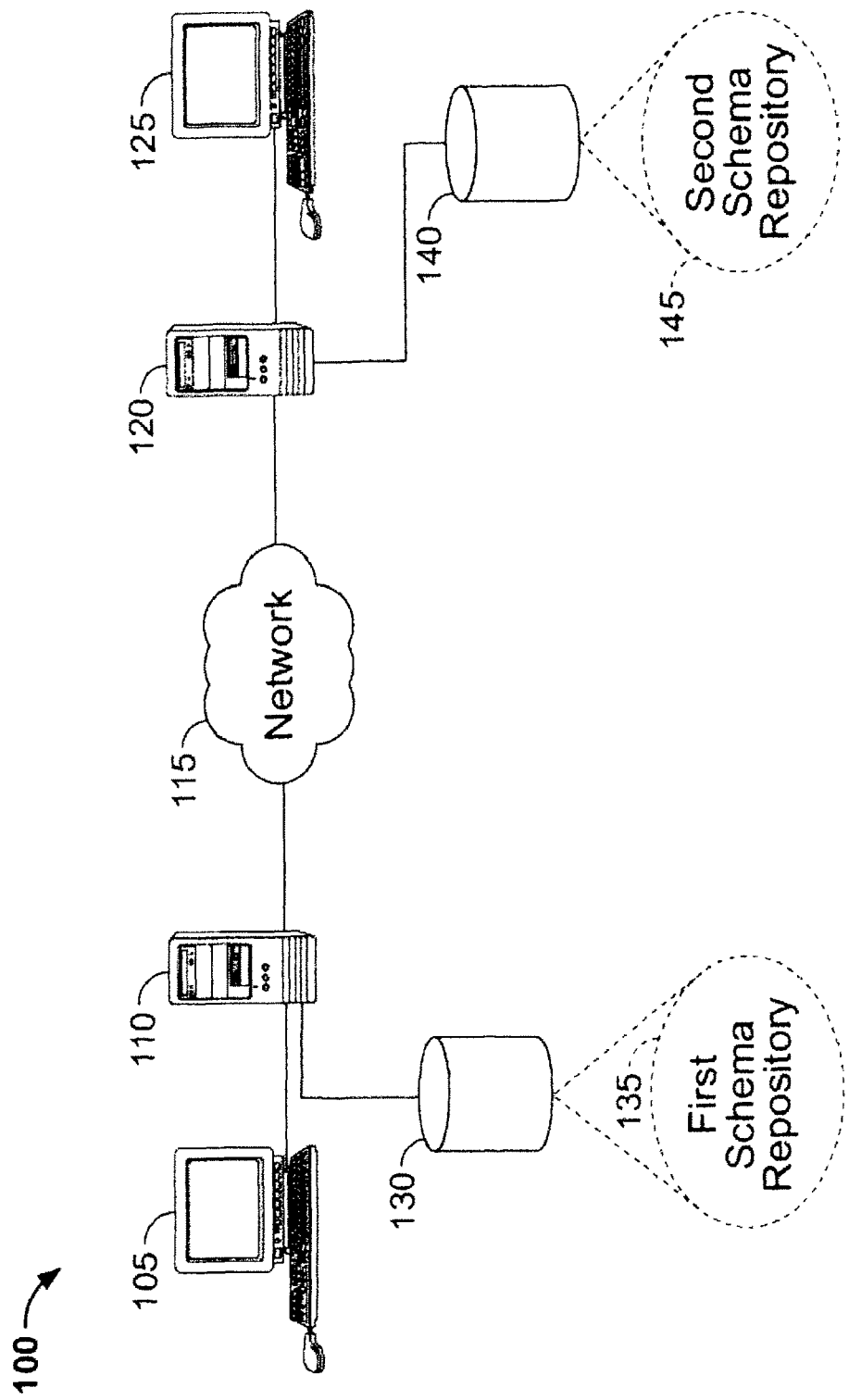
FIG. 1 is a block diagram of a computer system that uses one or more business communication schemas.

FIG. 1 is a block diagram of a system 100 for transacting electronic business using one or more business communication schemas. Particularly, the system 100 can handle documents where layout information for a data element is included in a schema definition for the data element, as will be described below. In some examples, the system 100 can provide layout information based on a specified context of the documents.

The system 100 includes a first monitor 105 connected to a first computer 110 and a second monitor 125 connected to a second computer 120. Electronic business communications between the first computer 110 and the second computer 120 are conducted over a network 115, such as the Internet, in accordance with a business communication schema. To facilitate electronic business communications, the first computer 110 includes a data storage device 130 containing a first schema repository 135 and the second computer 120 includes a data storage device 140 containing a second schema repository 145. Each of the first schema repository 135 and the second schema repository 145 store metadata describing one or more formats defined by a business communication schema.

The monitor 105 displays user interfaces for allowing a user to enter or otherwise define business data to be included in an electronic document. The first computer 110 generates the electronic document in accordance with the metadata stored in the first schema repository 135. In particular, the first computer 110 organizes the data entered by the user according to a communications schema format defined in the first schema repository 135. The generated electronic document can then be transmitted over the network 115 to a receiving entity, such as the second computer 120. The second computer 120 is capable of interpreting received electronic documents in accordance with the metadata stored in the second schema repository 145. In particular, the second computer 120 interprets data contained in a received electronic document according to a communications schema format defined in the second schema repository 145.

One or more communications schemas can be defined in each schema repository 135 and 145. In some cases, two enterprises that wish to transact electronic business agree to use a particular communication schema that both enterprises support. In other words, the same communication schema is defined in both the first schema repository 135 and the second schema repository 145. In such a case, an electronic document generated by the first computer 110 using the particular communication schema can be interpreted by the second computer 120 using the metadata in the second schema repository 145, and the monitor 125 can display user interfaces that include the data contained in the electronic document.

Figure 2:
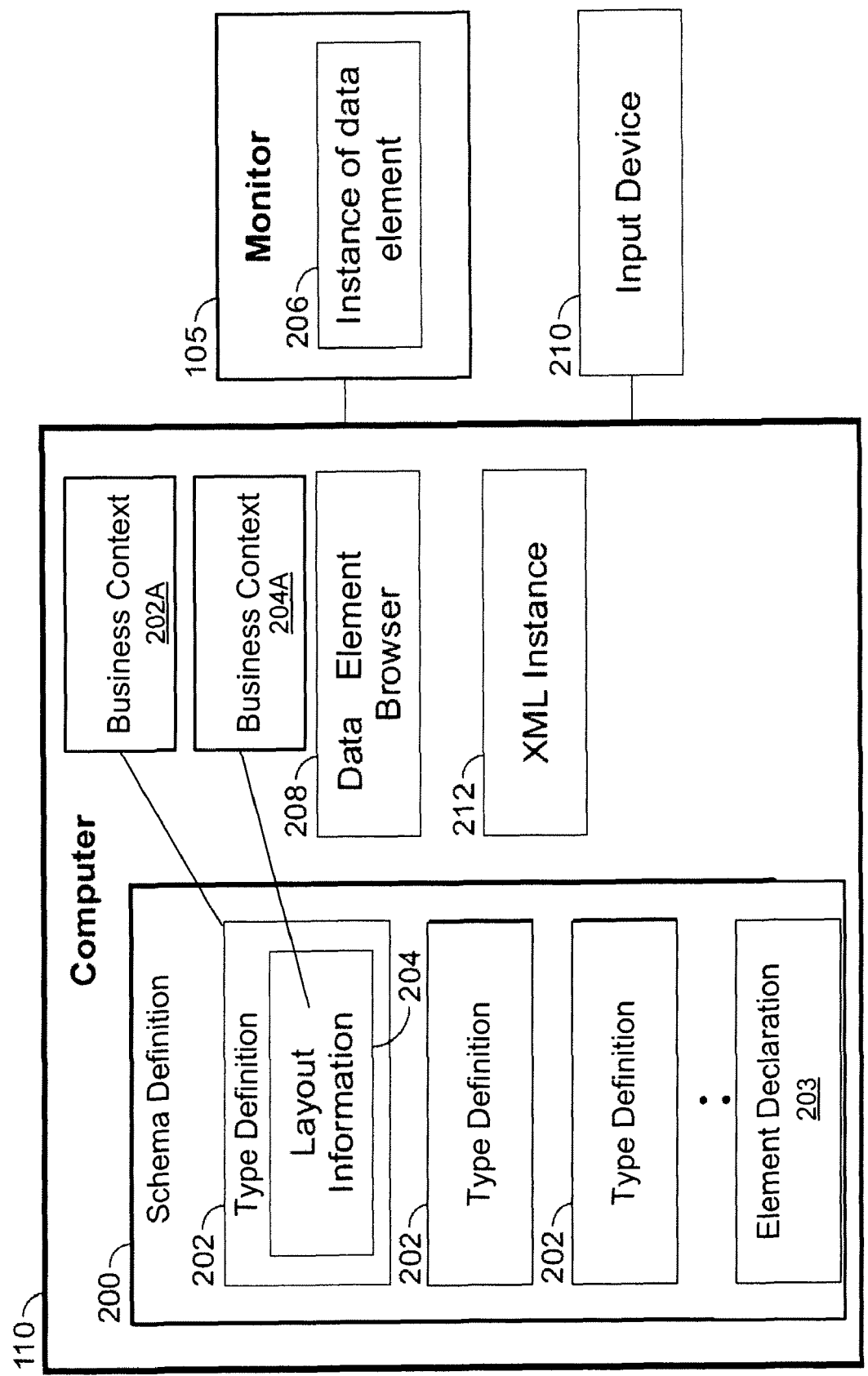
FIG. 2 is a block diagram of a computer system that uses layout information for a data element.

FIG. 2 is an example of elements used by any or all participants in the system 100, such as the first computer 110. For simplicity, the data repository 130 and the first schema repository 135 are not explicitly shown. Here, the computer 110 uses a schema 200 that contains one or more type definitions 202. Every schema definition has one or more type definitions 202 and in some implementations one or more element declarations 203. Every type definition has a business context and also layout information, and this layout information may be associated with further business context information. The type definitions 202 relate to, and define semantics of, data elements that can be used in business documents handled by the computer 110. For example, each of the data elements may correspond to an address, a date, an amount, and so on. Moreover, the type definition 202 for a particular data element may include layout information 204 for the data element. The layout information 204 defines the form of the data element when it is printed or displayed. The layout information may be based on XForms, extensible hypertext markup language ((X) HTML), XSLT, XPath or other relevant XML-based meta languages. Alternatively, the layout information can be based on XSL:FO or another layout script language.

Using the layout information 204, the computer 110 can display an instance 206 of the data element on the monitor 105. Data elements may be displayed using a data element browser 208 which will be described later. A user can enter information in the computer 110 using an input device 210. Particularly, if the user edits the data element, such as by entering a date or an amount, the computer 110 can generate an XML instance 212 that includes the user input. As another example, the computer 110 receives the XML instance 212 over the network for display on the monitor.

In some embodiments, the layout information 204 can be context-driven. For example, the computer 110 can include alternative versions of layout information 204 and choose between them at runtime based on context attributes included in a business communication document. In some examples, the computer may retrieve different forms and names based on the context of the received business communication document. Here, the type definition 202 is associated with a business context 202A and the layout information 204 is associated with a business context 204A. Thus, the type definition 202 and/or the layout information 204 can be selectively chosen based on the particular business context. More than one, or all, of the type definitions 202 and/or the layout informations 204 can have business context values assigned to them. In this example, the contexts 202A and 204A are shown outside the schema definition 200. In other implementations, one or more of the contexts 202A and 204A can be included in the schema definition 200.

Figure 3:
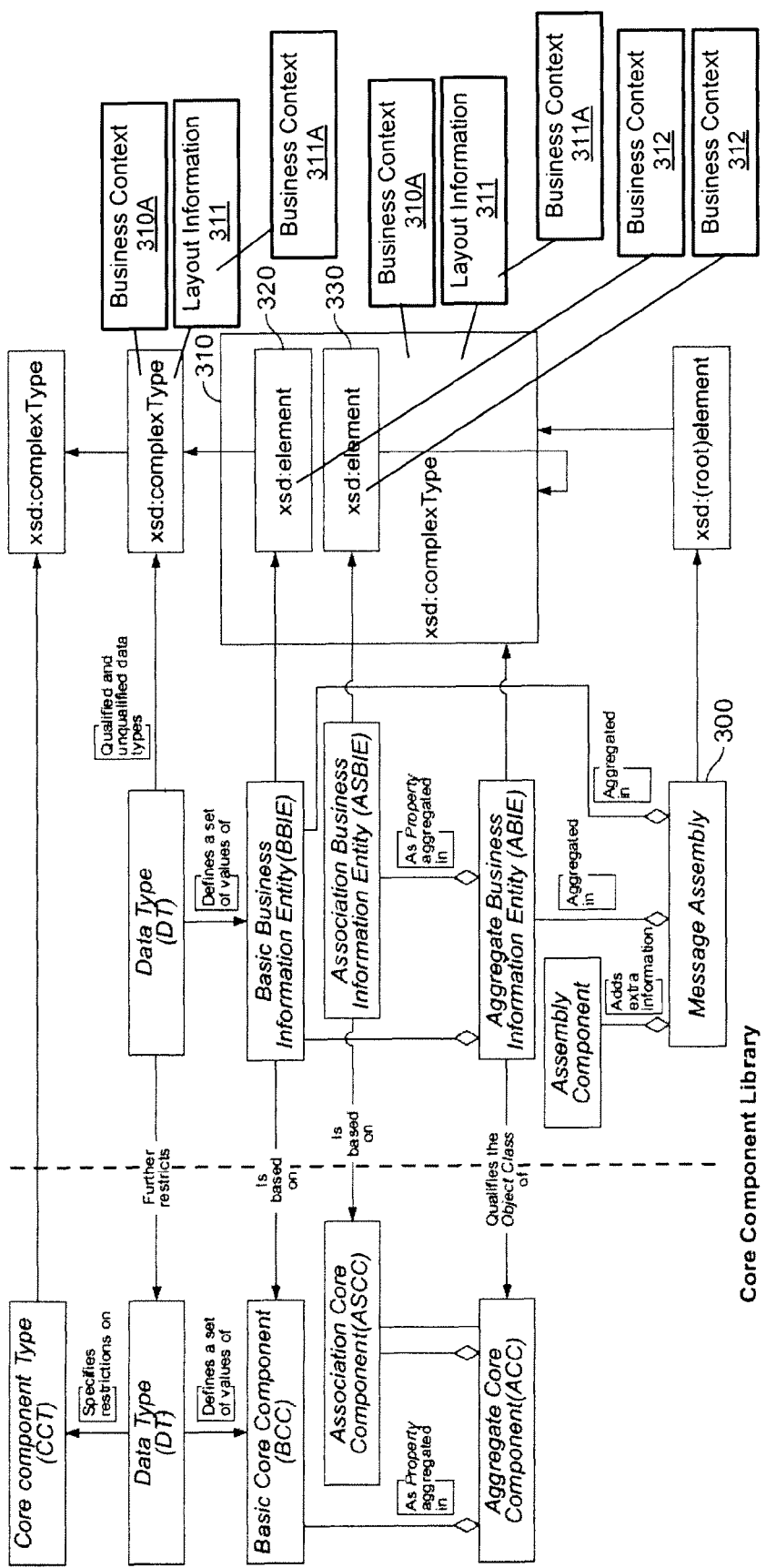
FIG. 3 schematically illustrates relationships between core elements, business information entities, and schema definitions.

CCTS, including its naming and design rules, makes it possible to define XSD based reusable building blocks (here called XSD artifacts) for assembling any kind of business information and/or business documents. The schema definition 202 and the layout information 204 are examples of such XSD artifacts. Such building blocks are based on an XML schema, using consistent rules for naming and structuring, to give clear and categorized information about the generic and context-specific parts. According to CCTS, schemas can be developed from fully conformant Business Information Entities (BIEs) that are based on fully conformant Core Elements (CCs). A CC is a building block for the creation of a semantically correct and meaningful information exchange package. The CC contains only the information pieces necessary to describe a specific concept. A BIE is a piece of business data or a group of pieces of business data with a unique business semantic definition. When a CC is used in a real business circumstance it serves as the basis of a BIE. Additional aspects of CCTS will now be described with reference to FIG. 3, which shows relationships between CCs, BIEs and XSD artifacts. CCs, BIEs, CC types (CCTs) and data types (DTs) are considered CCTS constructs. XSD constructs, in contrast, are here named xsd:types, xsd:elements and xsd: attributes. The following basic principles apply to these elements.

1. A message assembly 300 is represented as a complex type designated as the root element of an XML message.

2. An Aggregate BIE (ABIE) is defined as a complex type and is a collection of related pieces of business information that together convey a distinct business meaning in a specific business context.

3. An Association BIE (ASBIE) is a BIE that represents a complex business characteristic of a specific object class in a specific business context, and has a unique business semantic definition. The ASBIE is declared as a local element within the complex type representing the associated ABIE. The ASBIE element is in itself based on (is of type) complex type of the associated ABIE.

4. A Basic BIE (BBIE) represents a singular business characteristic of a specific object class in a specific business context. It has a unique Business Semantic definition and is derived from a Basic CC. The BBIE is declared as a local element within the complex type representing the parent ABIE, and is based on an (is of type) unqualified or qualified DT.

5. A DT defines the set of valid values that can be used for a particular BCC property or BIE property. It is defined by specifying restrictions on the CC type that forms the basis of the DT. The DT is declared as a complex type or simple type. Whenever the facets of the built-in data type are equivalent to the built-in supplementary elements for that data type, xsd: built-in data types will be used.

6. A qualified DT for code lists, which is defined as a simple type, is based on a simple type of code list content.

7. A qualified DT for identifier schemes, which is defined as a simple type, is based on a simple type of identifier scheme content.

Particularly, every complexType of a Data Type can have a business context 310A and a layout information 311. More that one layout information could be instantiated, for example such that each of them are considered in a specific business context, which is a subset of the business context of the data type. For example, the layout information 311 can be associated with a business context 311A. As another example, every complex type of an ABIE can have a business context and layout information. Several layout informations for different subsets of a business context can be defined. As another example, every element declaration of a ABIE could be also considered in a business context that is always a subset of the business context of the ABIE. An element can be associated with a business context 312.

The primary types of CCTS-based elements are the unqualified data types, which are the representation terms defined in the standard named ISO 11179. Every unqualified data type is based on one of the 10 different CC types. CCTS defines the structure of each data type in a common way by content and some extra features, called supplementary elements. The values of the content and/or of the supplementary elements can be restricted by defining unqualified data types. The unqualified data types are given in the following table:

| Representation Type | Definition |
|---|---|
| Amount | A number of monetary units specified in a currency where the unit of currency is explicit or implied. |
| Binary Object | |
| Code | A character string (letters, figures or symbols) that for brevity and/or language independency may be used to represent or replace a definitive value or text of an attribute. Codes usually are maintained in code lists per attribute type (e.g. color). |

-continued

| Representation Type | Definition |
|---|---|
| Date | A day within a particular calendar year. Note: Reference ISO 8601 for format. |
| DateTime | A timestamp, consisting of a date and time. Reference ISO 8601 for format. |
| Graphic | |
| Identifier | A character string used to identify and distinguish uniquely, one instance of an object within an identification scheme from all other objects within the same scheme. |
| Indicator | A list of two, and only two, values which indicate a condition such as on/off; true/false etc. (synonym: "boolean") |
| Measure | A numeric value determined by measuring an object. Measures are specified with a unit of measure. The applicable units of measure is taken from UN/ECE Rec. 20. |
| Name | A word or phrase that constitutes the distinctive designation of a person, place, thing or concept. |
| Picture | |
| Percent | A rate expressed in hundredths between two values that have the same unit of measure. |
| Quantity | A number of non-monetary units. It is associated with the indication of objects. Quantities need to be specified with a unit of quantity. |
| Rate | A quantity or amount measured with respect to another measured quantity or amount, or a fixed or appropriate charge, cost or value e.g. U.S. Dollars per hour, U.S. Dollars per EURO, kilometer per liter, etc. |
| Sound | |
| Text | A character string generally in the form of words of a language. |
| Time | The time within a (not specified) day. Reference ISO 8601: 1988. |
| Video | |

CCTS describes only the structure, semantic and the XML-based representation of reusable building blocks, but not how to effectively visualize the information. However, using a consistent definition of embedded layout information in every XSD artifact, it is possible to achieve effective visualization and visual usage in design- and run-time of CCTS-based building blocks. Each XSD artifact of every CCTS based building block may be configured to describe the semantic, naming, structure and additionally the relative layout information for it. The layout information can be made context-specific, for example by associating it with a context value. When such building blocks are assembled together, they define not only the complete business semantic and structure of a business document, but also the layout of the business document. Accordingly, the computer 110 processes the type definition 202, including the layout information 204, to generate a display of the instance 206 in the GUI.

Figure 4A:
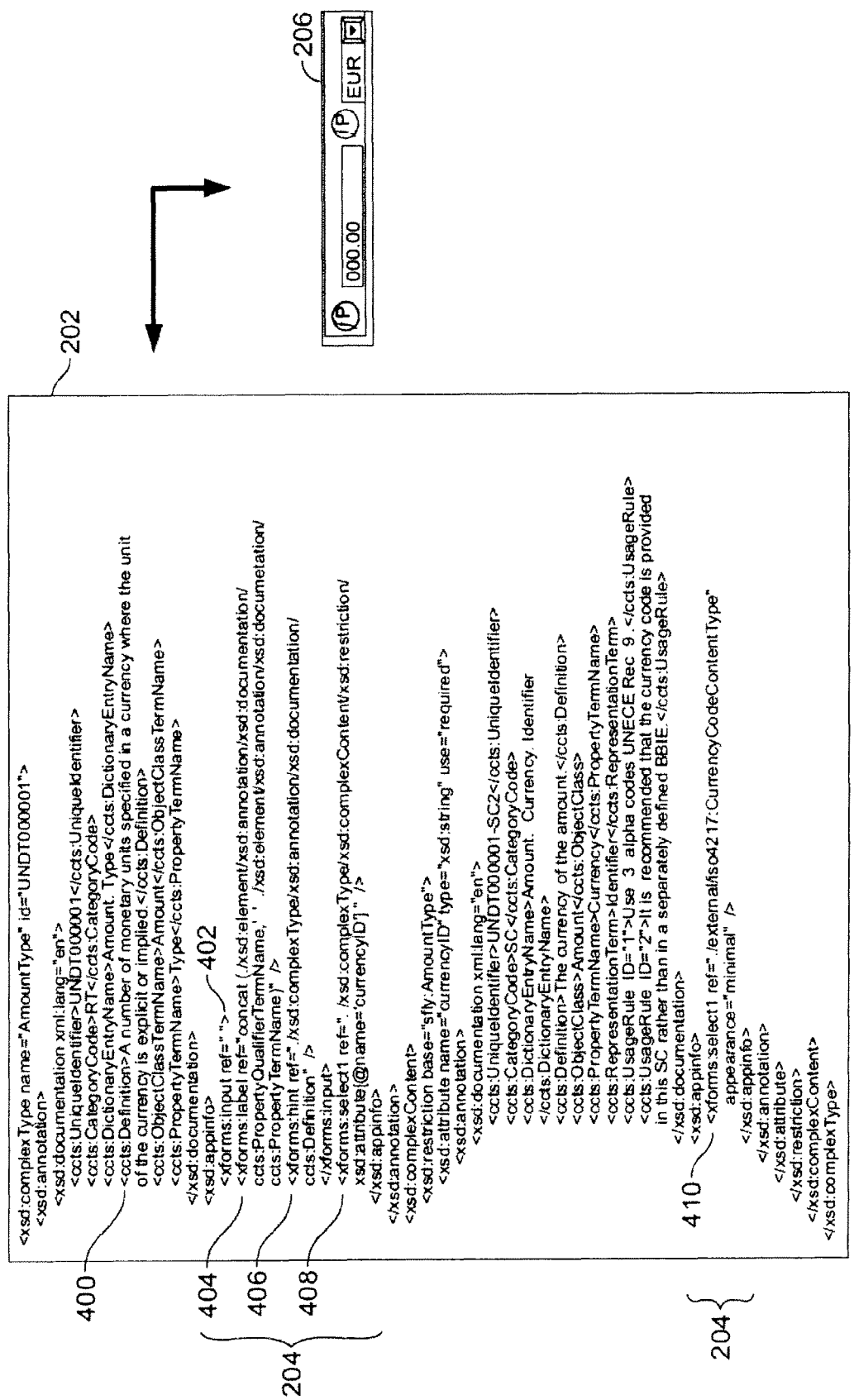
FIGS. 4A-B show a schema definition for a first data element and a displayed instance of the first data element.
Figure 4B:
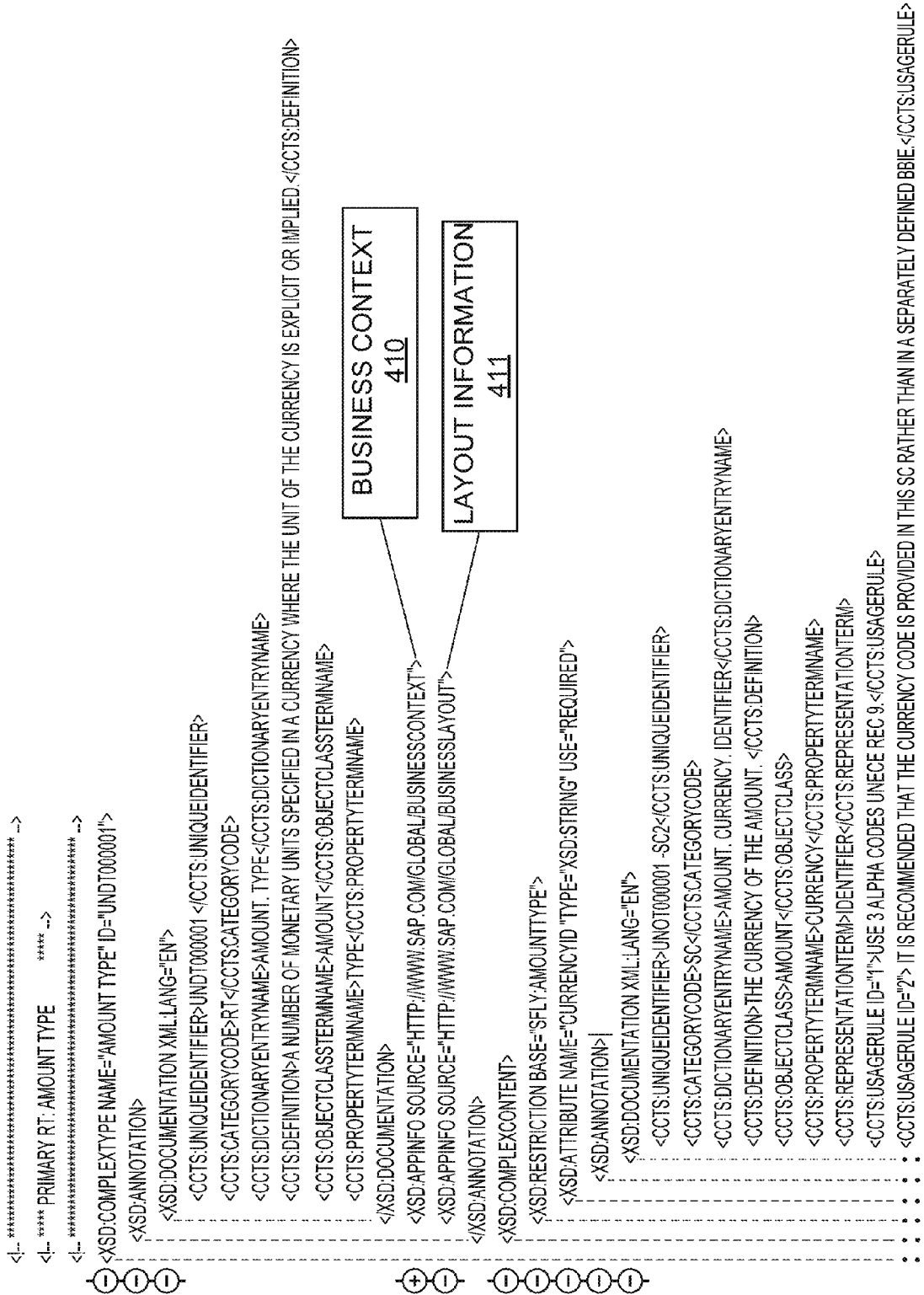
Figure 4B:
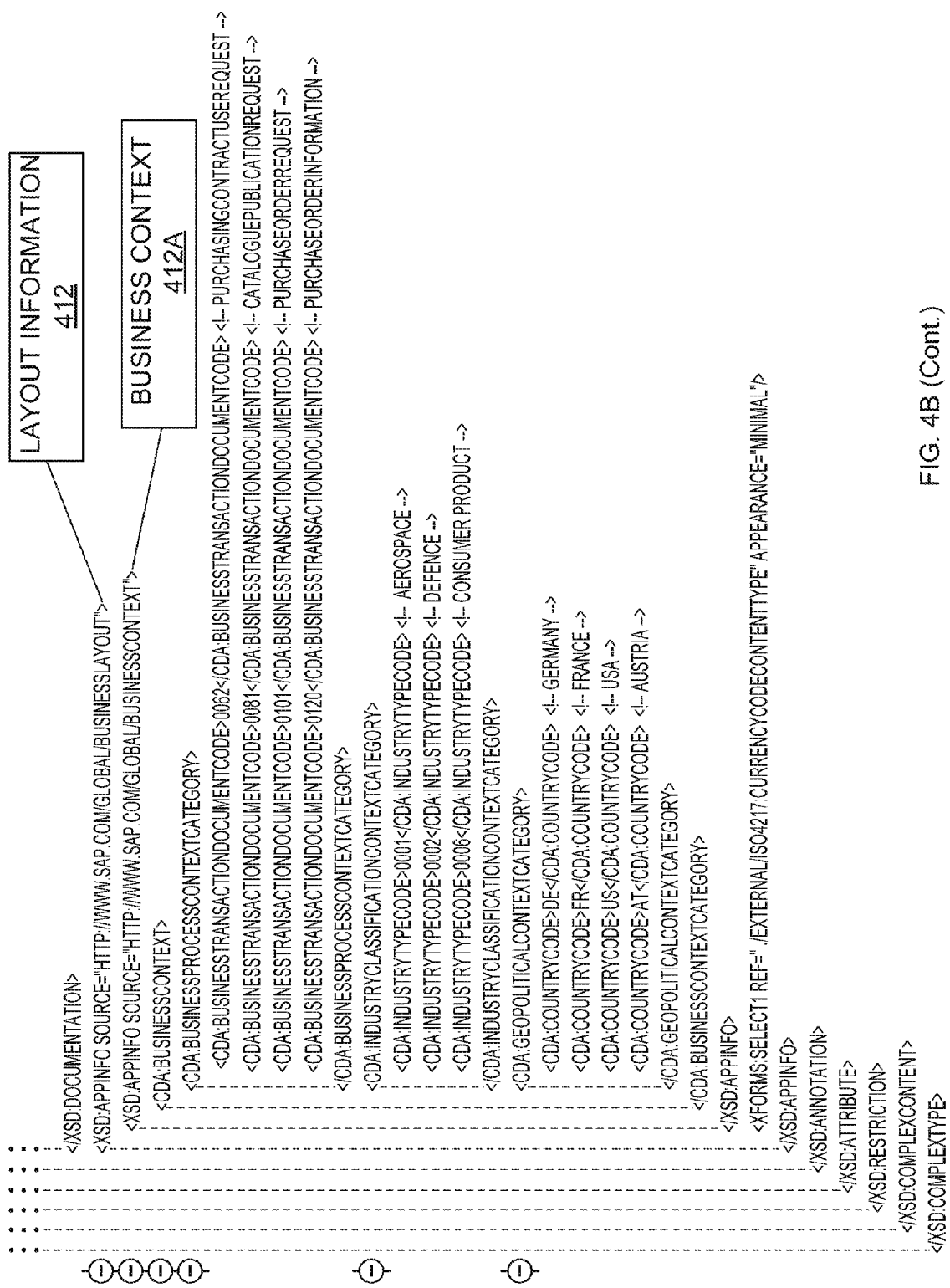

An example of such processing will now be described with reference to FIGS. 4A-B that show examples of the schema definition 202 including the layout information 204, and the corresponding displayed data element instance 206. Either or both of the schema definition and the layout information can be context specific.

The schema definition is the complete complex type of a unqualified data type, here "Amount. Type" which according to definition 400 is a "number of monetary units specified in a currency where the unit of the currency is explicit or implied." The layout information is defined directly in the annotation/appinfo of the complex type (or simple type, in another example).

The complex type has the embedded layout information 204 in two places. The first portion of the layout information (complexType/annotation/appinfo) is for the representation of the complete type and the second layout information (complexType/annotation/appinfo) is for the supplementary element, which is represented as an attribute.

A UI control xforms:input 402 creates an input field for obtaining the value of the content element "Amount. Content". The characteristics of xforms:input are based on the built-in data type "xsd:decimal". Additionally, the layout information 204 defines some further information for the GUI to show:

A. An xforms:label 404 selects the UI label information from the implicit CCTS based documentation by a relative XPath instruction. Accordingly, label information can be defined by referring to the rest of the schema definition for the data element. In this case the values of ccts:PropertyQualifierTermName and ccts:PropertyTermName will be selected.

B. An xforms:hint 406 selects the UI tool tip information from the ccts:definition by a relative XPath instruction. This provides a help function for a user that is entering or reading the data element.

C. An xforms:select 408 selects the additional layout information for the representation of the supplementary element "currencyID". The xforms:select references the attribute construct of the supplementary element "currencyID". For detailed representation of each supplementary element, additional layout information is defined within the attribute declaration, which is here the lower of the two portions of layout information 204. For example, an xforms:select1 410 defines a selection control in order to create selection controls that return an atomic value. Here, the selection returns a currency code and the instance 206 includes an input field for a currency amount and a drop-down list box for a currency code (currently showing EUR for euro). The layout information refers to an external code list to get the complete list for the selection of one code. The code list construct will be described below.

Schema definitions that are not of complex type are of simple type. The simple type of an unqualified and qualified data type does not have additional attributes for the representation of supplementary elements; it includes only the value space of an element. This value space, in turn, can be based on a specific built-in data type and some additional facets for the restriction of value and lexical characteristics.

In some examples, the schema definition can be specific to a business context. For example, as shown in FIG. 4B, the schema definition can include a business context 410 that defines the context(s) in which the data structure is valid. The schema definition can include layout information 411 that defines a visual representation of the data. The schema definition also can include a layout information 412 with an associated business context 412A.

In some examples, a schema definition can include context specific data types in the embedded layout information 204. For example, the schema definition can include code that defines at least one relevant context of a defined layout. As an illustrative example, additional code may be added to the schema 400 so that the instance 206 may display a U.S. layout instead of an European layout when a geographical business context of the business communication is "United States".

Figure 5A:
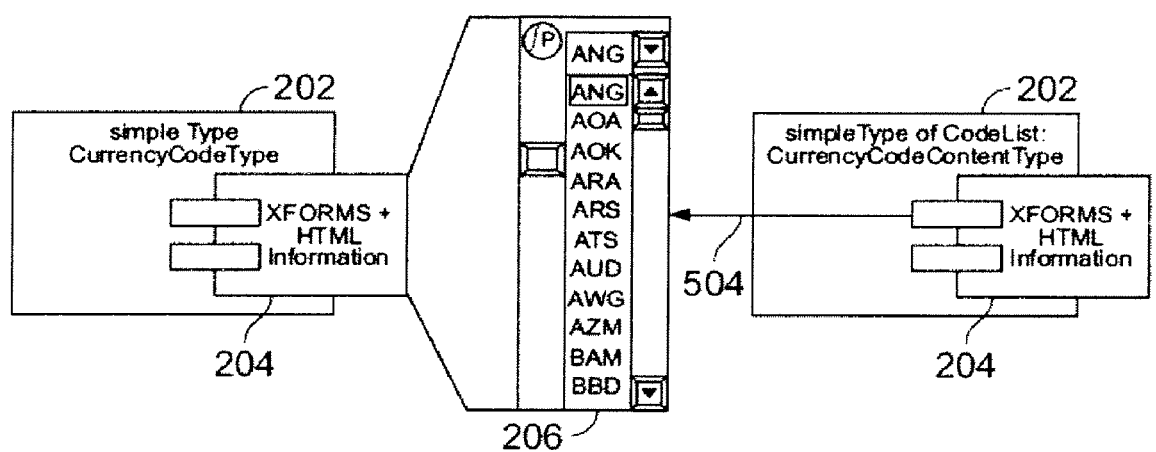

Unqualified or qualified data types may refer to specific code lists or identifier schemes by their attributes or content elements. Such code lists or identifier schemes are defined as external schema modules. FIGS. 5A-E show an example thereof, where a qualified data type "Currency. Code. Type" refers to an external currency code list. In FIG. 5A, the schema definition 202 is of the simpleType: CurrencyCode Type and the layout information 204 includes XFORMS and HTML information. The instance 206 of the data element is a drop-down list box for the currency codes, currently showing alternative codes in the range ANG to BBD. Here, the XFORMS and HTML information may also be configured to include business context for layout within appinfo of relative layout structure.

Figure 5C:
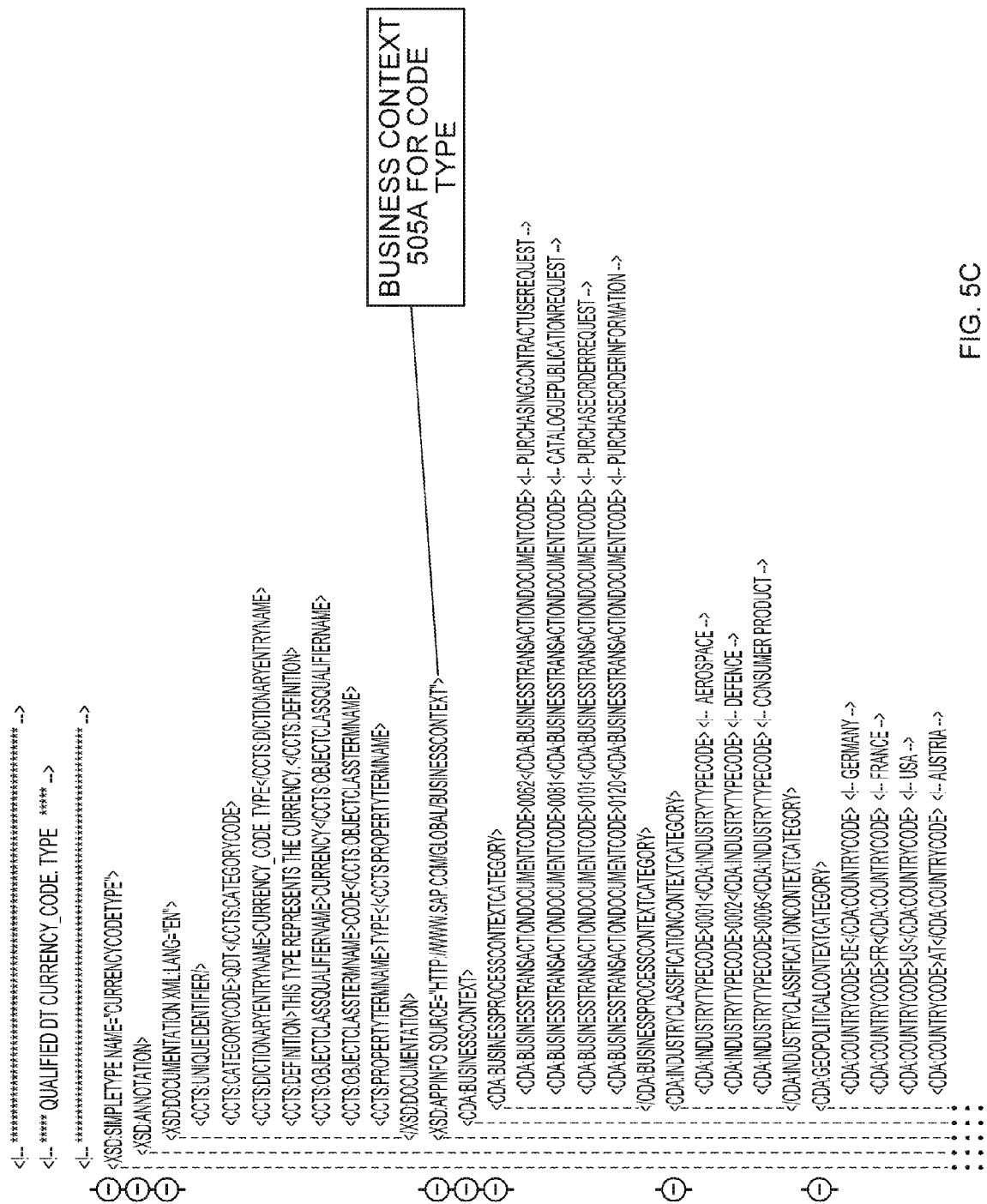
Figure 5C:
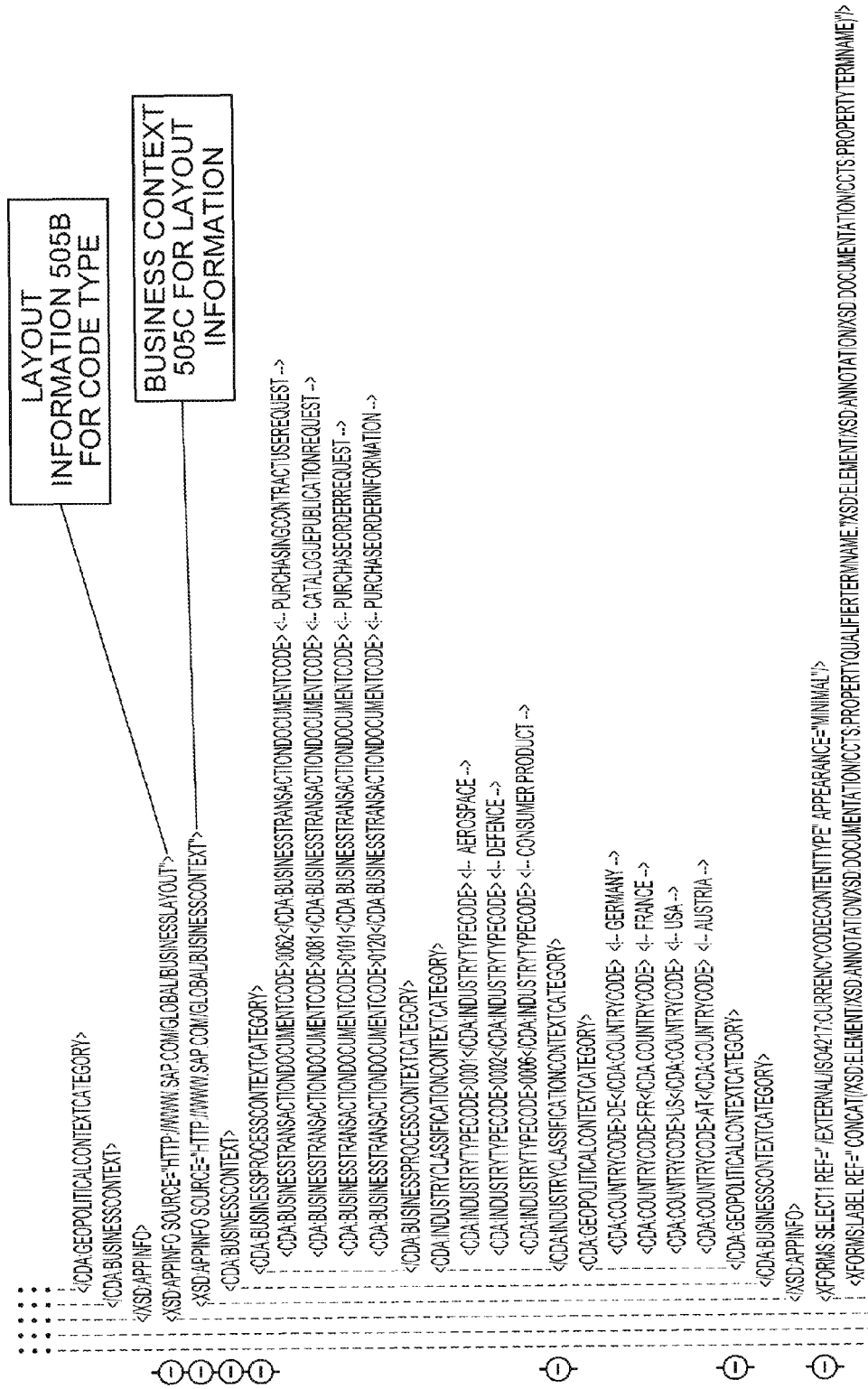

The layout information of the unqualified data type itself defines the kind of selection control by a specific xForms control. FIG. 5B shows an example of the schema definition 202 for the currency code type. An xforms:select1 500 defines a selection control for creating selection controls that return an atomic value. Here, the select returns a currency code. Reference is made, by an XPath element, to an external code list to get the complete list for the selection of one code. Additionally, an xforms:label 502 defines a label, extracting the label information from the implicit CCTS-based documentation using an relative XPath construct. FIG. 5A shows a reference 504 from the unqualified data type to the external XML schema module that has the specific code list. Here, as shown in FIG. 5C, there is included a business context 505A for the code type. A layout information 505B is included in the definition. The layout information is associated with a business context 505C.

Figure 5E:
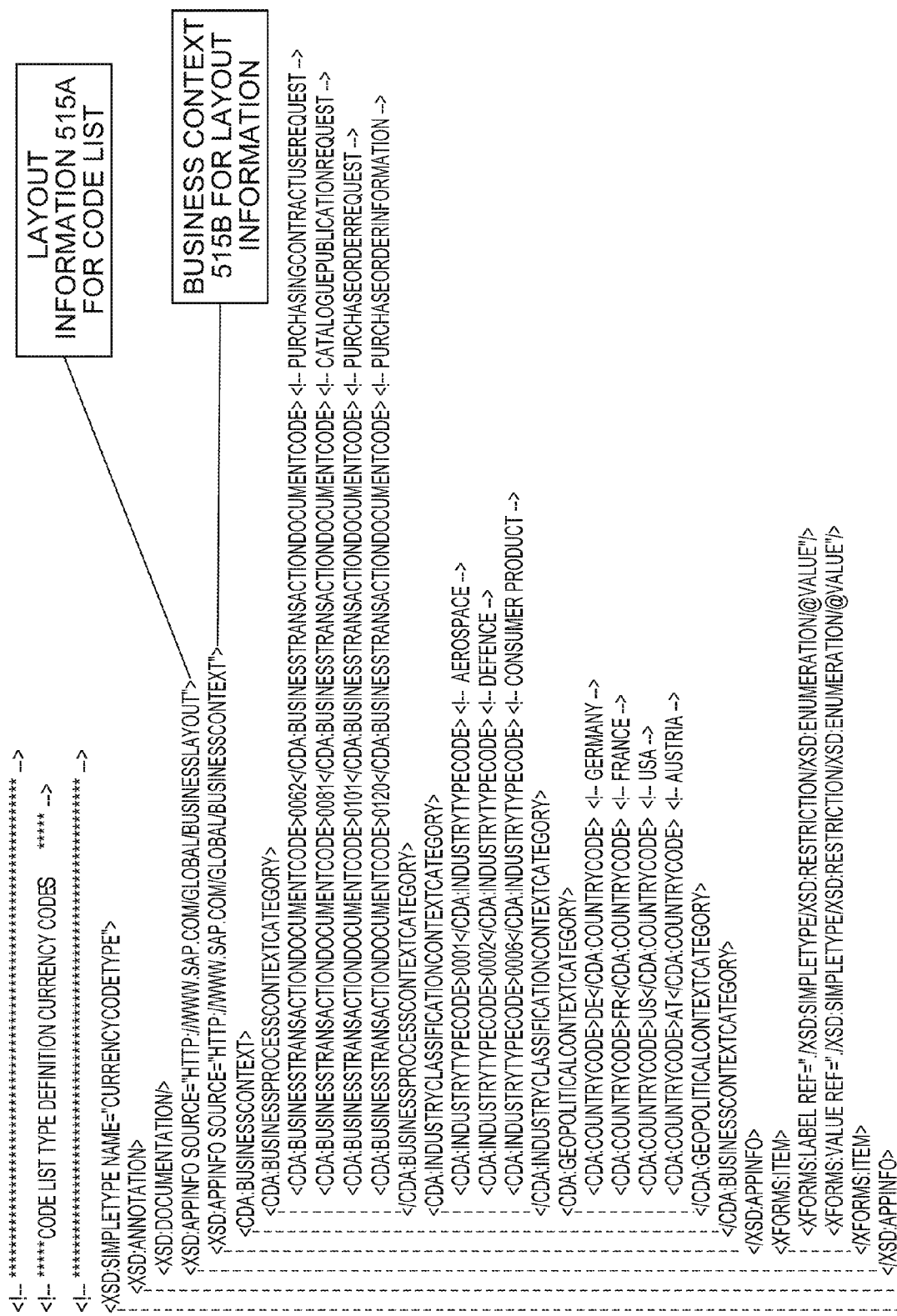
Figure 5E:
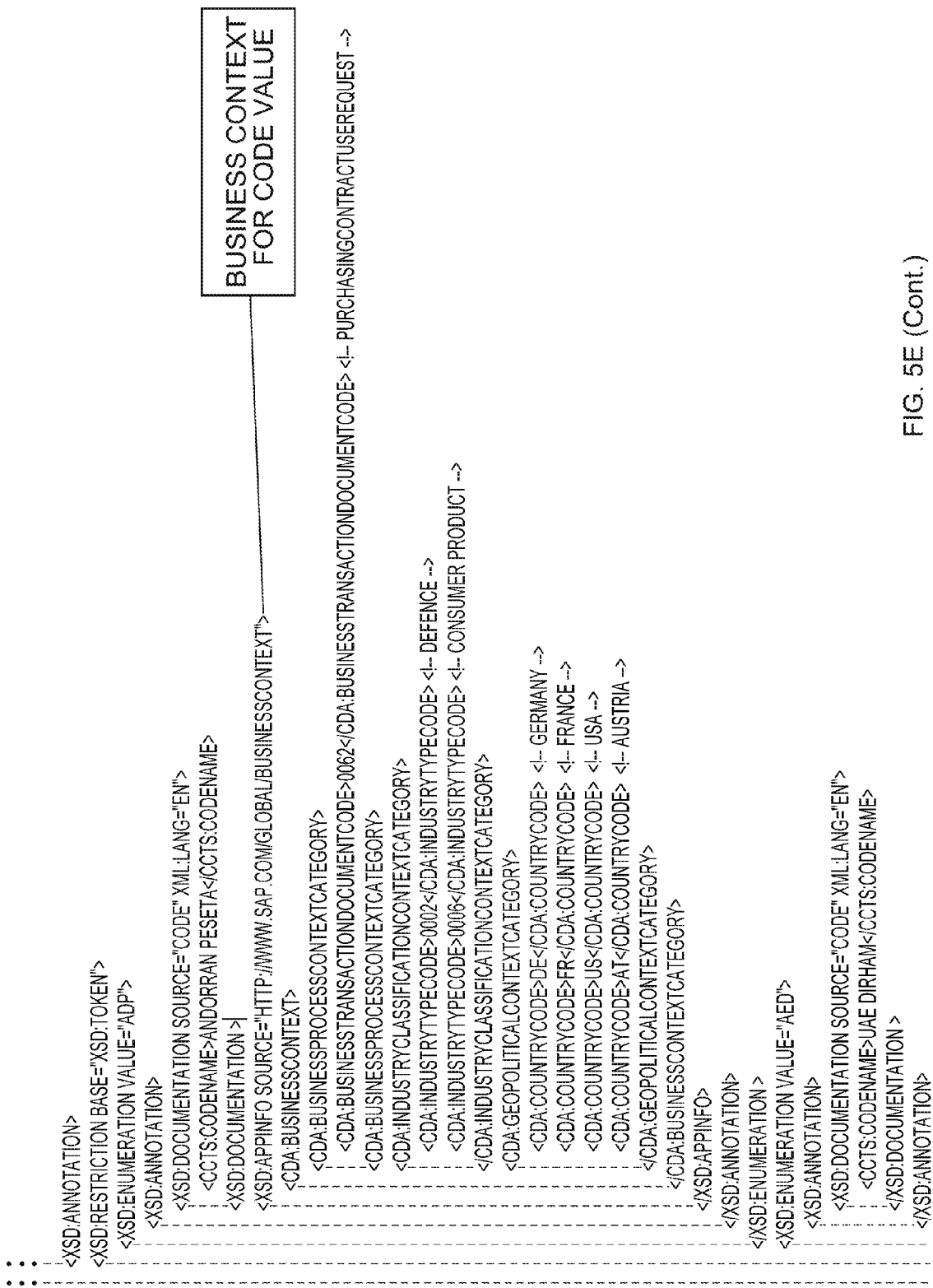

FIG. 5D, in turn, shows the schema definition of the external schema module of the currency code list. In this implementation, every code list has context information associated with it. The schema definition includes the layout information 204 for the specific representation of the currency codes and several enumeration values 506, each corresponding to one of the currency codes ADP, AED and AFA. The list of enumeration values is here truncated, as indicated by an ellipsis 508. An xforms:item 510 encodes the available choices defined by all enumeration values. The enumeration values are represented by an xforms:value control 512. An xforms:label 514 supplies the complete name of each code value. Accordingly, processing the exemplary schema definition 202 and layout information 204 results in display of the instance 206 shown in FIG. 5A. Here, as shown in FIG. 5E, layout information 515A is provided for the code list. The layout information has a business context 515B associated therewith.

BBIEs and/or ASBIEs (see FIG. 3) can be combined into an ABIE. Layout information embedded in these respective entities is then used in visually representing the ABIE. This means that assembling the schema of the ABIE also provides the corresponding UI layout. Accordingly, only one modeling needs to be performed.

The ABIE is a complex object class and is a collection of related pieces of business information that together convey a distinct business meaning in a specific business context. The ABIE is defined as an xsd:complexType 310. An ABIE is defined as containing at least one BIE Property. A BIE Property is either a BBIE or an ASBIE. A BBIE is declared as a local declared element 320 within the complex type 310 and is based on the xsd:complexType or xsd:simpleType of a specific unqualified or qualified data type. An ASBIE also is declared as a local element 330 within the complex type 310. The ASBIE itself is based on an xsd:complexType of the associated ABIE.

The xsd:complexType of the ABIE defines the layout information for the correct visual representation of the ABIE, including all collected related pieces (BBIEs and ASBIEs) within the ABIE. This layout information may include xforms controls for the correct representation of the sequence of BBIEs or ASBIEs and some additional information for further layout of the complete ABIE (like frame, tabs, header, etc.). For the specific representation of the child nodes (BBIEs and/or ASBIEs), the xforms control refers to the equivalent complex types or simple types. The complex or simple types on which the BBIEs or ASBIEs are based include the further layout information. The specific layout information of a BBIE node is defined in the simple or complex types of the associated unqualified or qualified data type on which the BBIE is based. Similarly, the layout information of an ASBIE node is defined in the complex types of the associated ABIE on which the ASBIE is based.

ABIEs and BBIEs may be associated with context categorized layout information. For example, when a computer system, such as the system 110 or the system 120, should display layout information of the business data in a specific context, the computer system can identify data element using the received context definition to generate an instance of the identified data element for display.

Figure 10:
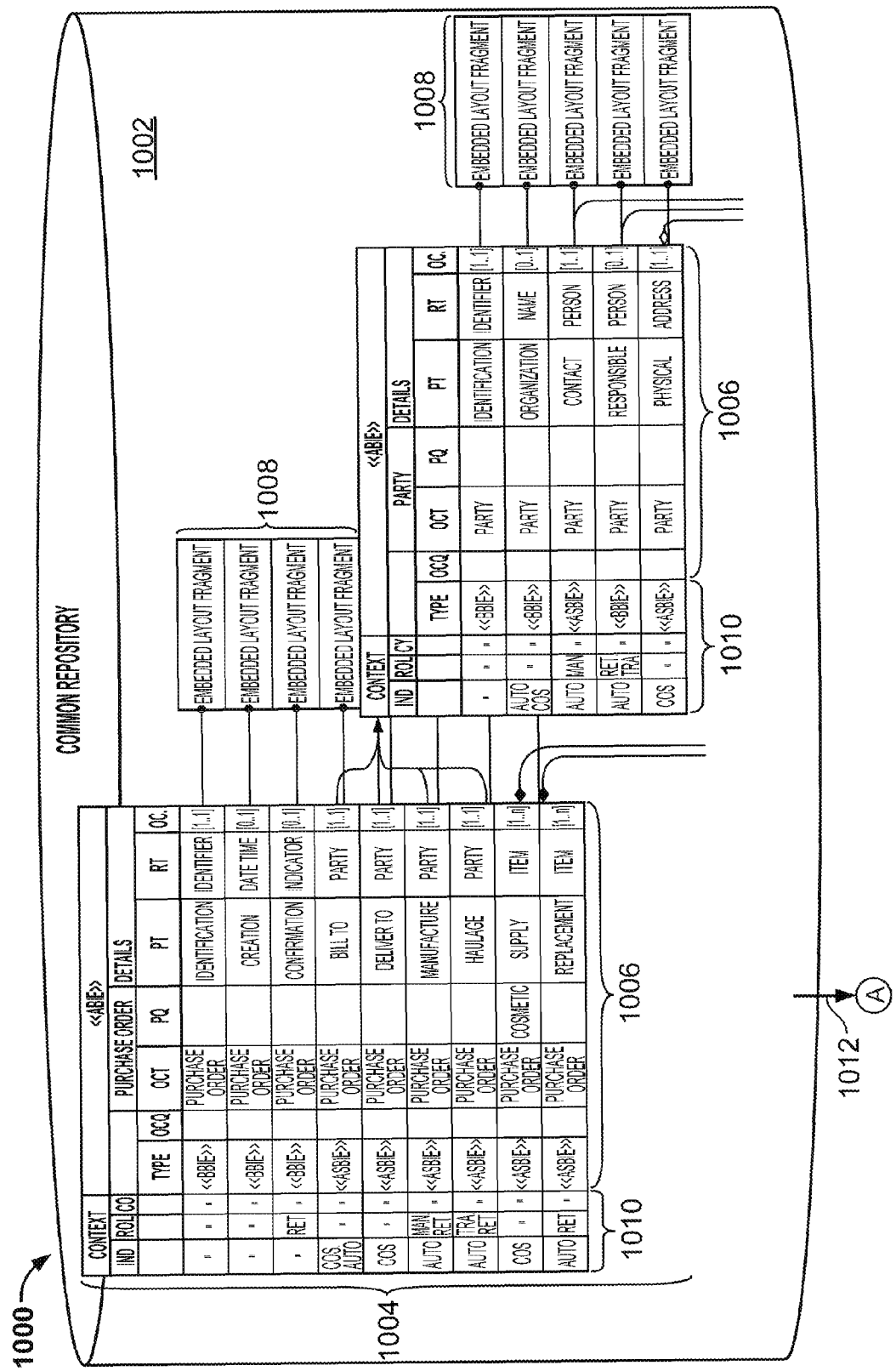
FIG. 10 schematically shows data elements in a common repository.
Figure 10:
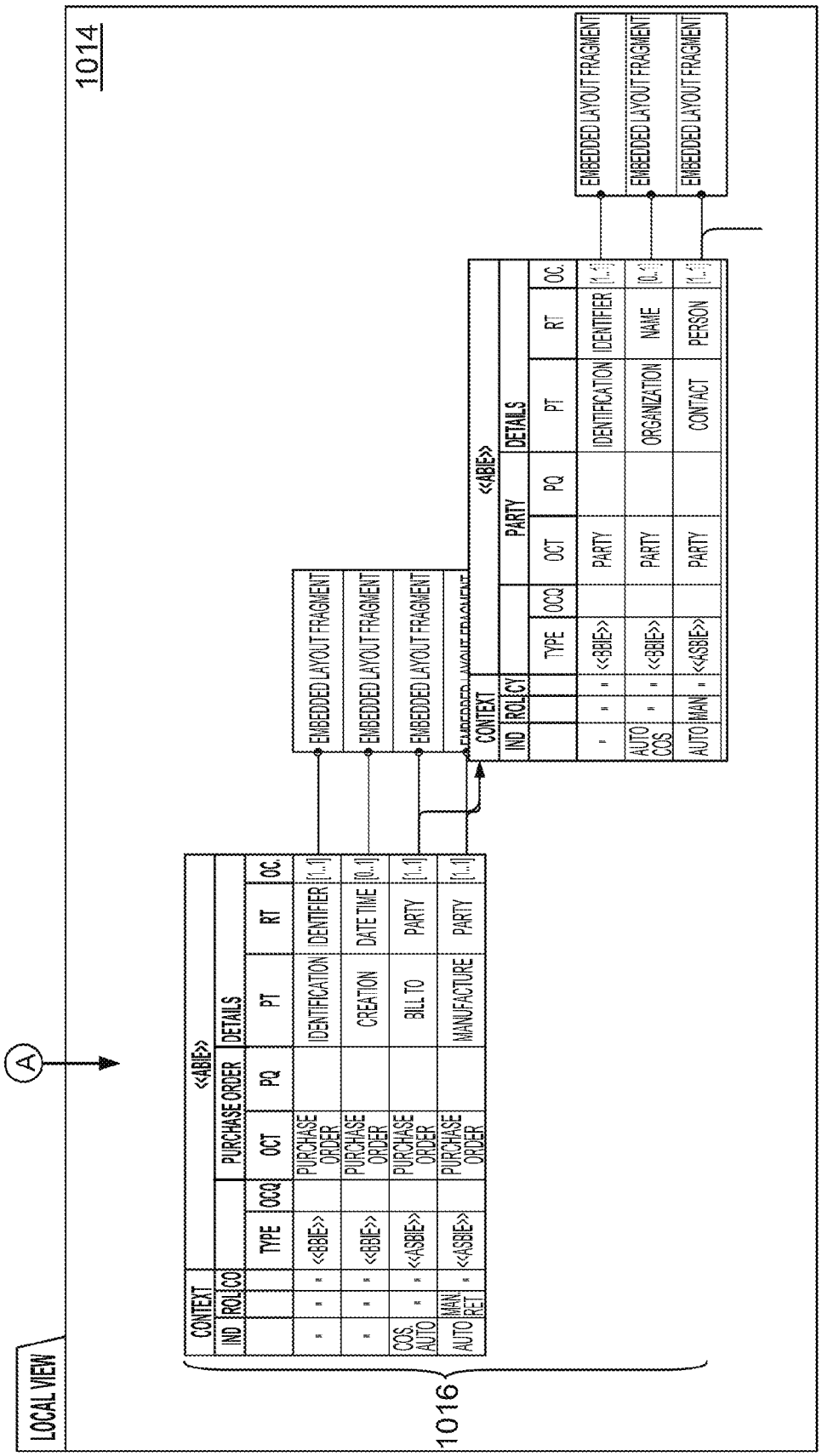

FIG. 10 schematically shows a portion of an example system 1000 for providing layout information. The system 1000 includes a common repository 1002 that stores metadata for business transactions. The common repository 1002 stores an overall structure 1004 for electronic communication. In this example, the structure 1004 includes data elements 1006, such as ABIEs, BBIEs, or ASBIEs. Each of the data elements 1006 is associated with one or more embedded layout fragment 1008. The embedded layout fragments 1008 can include layout information for generating electronic documents or the data element instances 206. The data elements 1006 are here also associated with context information 1010.

In some embodiments, the overall structure 1004 can be constructed by assigning context values to the embedded layout fragments 1008. For example, a modeller can assign context values to the embedded layout fragment 1008. In some examples, the common repository 1002 can restrict the data elements 1006 to be used only when the assigned context values are received. After the context values are assigned, the modeller can then store the layout information associating with the context values the common repository 1002. For example, the modeller can assign the context values to the embedded layout fragment 1008 in a schema definition format. More than one context value can be assigned to each embedded layout fragment 1008. In some embodiments, the assigned context values of the embedded layout fragments 1008 may be a subset of the context values 1010.

In some examples, any of the data elements 1006 can be associated with more than one embedded layout fragment 1008. Each of the embedded layout fragments 1008 associated with the data element 1004 may be assigned other context values to be stored in the schema definition form. In some embodiments, the modeller can also assign context value to the schema definition that includes a structural definition for any of the data elements 1006.

Figure 11:
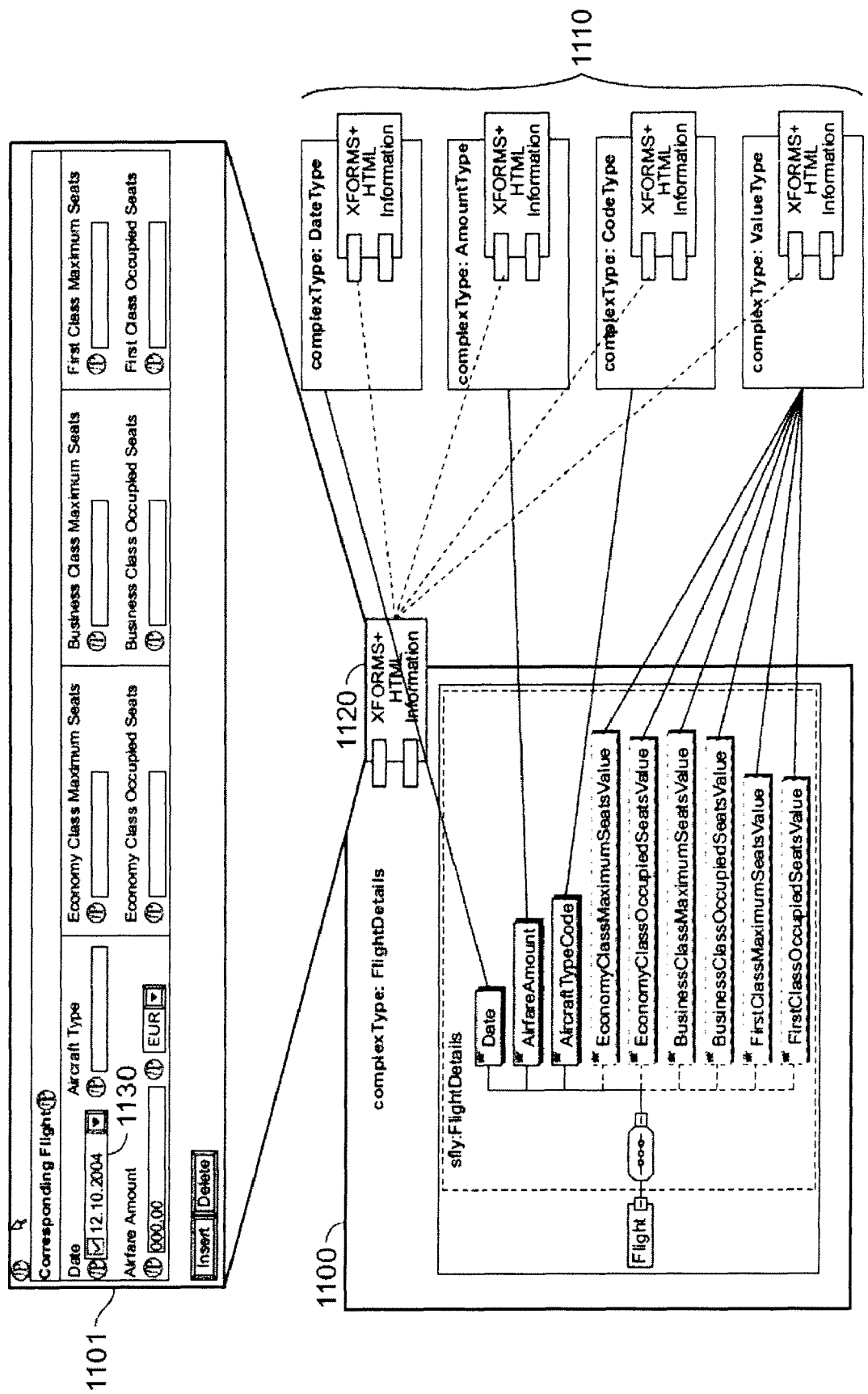
FIG. 11 schematically shows schema definitions and a displayed instance of a data element.

As shown by an arrow 1012, a user (e.g., a computer system) can retrieve a schema definition from the common repository 1002 to generate a local view 1014. In some examples, the local view 1014 can be generated when the user wishes to setup a local context-specific system for processing one or more documents received from a computer network. For example, the computer system 110 (FIG. 1) can retrieve a structure subset 1016 from the common repository 1002 before or when an electronic document is received from the computer system 120 via the network 115. Based on the context information 1010 and the context definition received from the user, the common repository 1002 can provide the context specific subset of the CCTS based data structure. For example, the common repository 1002 can provide data elements and layout information that are specific to a context of the local view 1014. Some examples of generating the local view 1014 using the context definition are described with reference to FIGS. 13-14. FIG. 11 schematically shows the assembly of an ABIE and the implicit references of layout information to all relevant child nodes. A "Flight. Details" ABIE 1100 appears as ABIE 1101 when printed or displayed in a GUI. The ABIE 1100 has several BBIEs 1110 associated with it. The BBIEs are based on qualified data types. Embedded in the ABIE is layout information 1120 that generally defines the frame and the tabs of this ABIE. The layout information 1120 further defines the order of the BBIEs and includes detailed information of each BBIE. For example, the detailed information is label information (xforms:label) or help information (xforms:hint). Detailed information can be selected from the implicit CCTS-based documentation by a relative XPath instruction. The detailed information about the representation of each BBIE comes from the specific unqualified data types. Therefore, each layout construct of each BBIE refers to the specific complex or simple types of the associated data types. The layout information 1120 can be made context-specific, for example in analogy with the description of FIG. 18 below.

FIGS. 12A-D includes an example of a complex type 1200 for the ABIE 1100. The complex type is an XSD artefact that includes the complete construct of layout information for the ABIE. Particularly, layout information 1210 in the complex type 1200 is shown in FIGS. 12A and 12B. An xforms:input 1220 refers to a specific element that represents the particular BBIE or ASBIE. Here, the xforms:input 1220 refers to a "Date" element. A <td> tag 1230 indicates that the "Date" element will be placed in a table cell. Referring briefly to FIG. 11, the displayed ABIE 1101 includes a "Date" element 1130.

The "Date" element can be declared as a DateType element, for example using a declaration 1230 as shown in FIG. 12E. By its definition, the element represents "the date of the flight." FIG. 12F, in turn, includes an XSD artefact 1240 for the DateType. The XSD artefact 1240 includes a layout information 1250. Particularly, an xforms:input 1260 creates the input field for obtaining the value of the element. An xforms: label 1270 selects the UI label information from the implicit CCTS-based documentation by a relative XPath instruction. Here, the values of ccts:PropertyQualifierTermName and ccts:PropertyTermName will be selected. An xforms:hint 1280 selects the UI tool tip information (a help function) from ccts:Definition by a relative XPath instruction.

The layout information 1210 for the ABIE 1100 refers to several other elements besides "Date," such as "AircraftType-Code" and "EconomyClassMaximumSeatsValue". Similarly to the "Date" element, these elements have corresponding declarations and type definitions. Thus, the layout information for all such elements is used in displaying the ABIE 1101.

As has been mentioned, the schema definition can be provided with context values to render a context-specific data element. In the example of FIGS. 12A-F, the portions of the definition labelled "appinfo" relate to the layout information for the data element, and the portions labelled "annotation" relate to the structure of the data element. Either or both of these portions can be provided with context-specific values.

Figure 18:
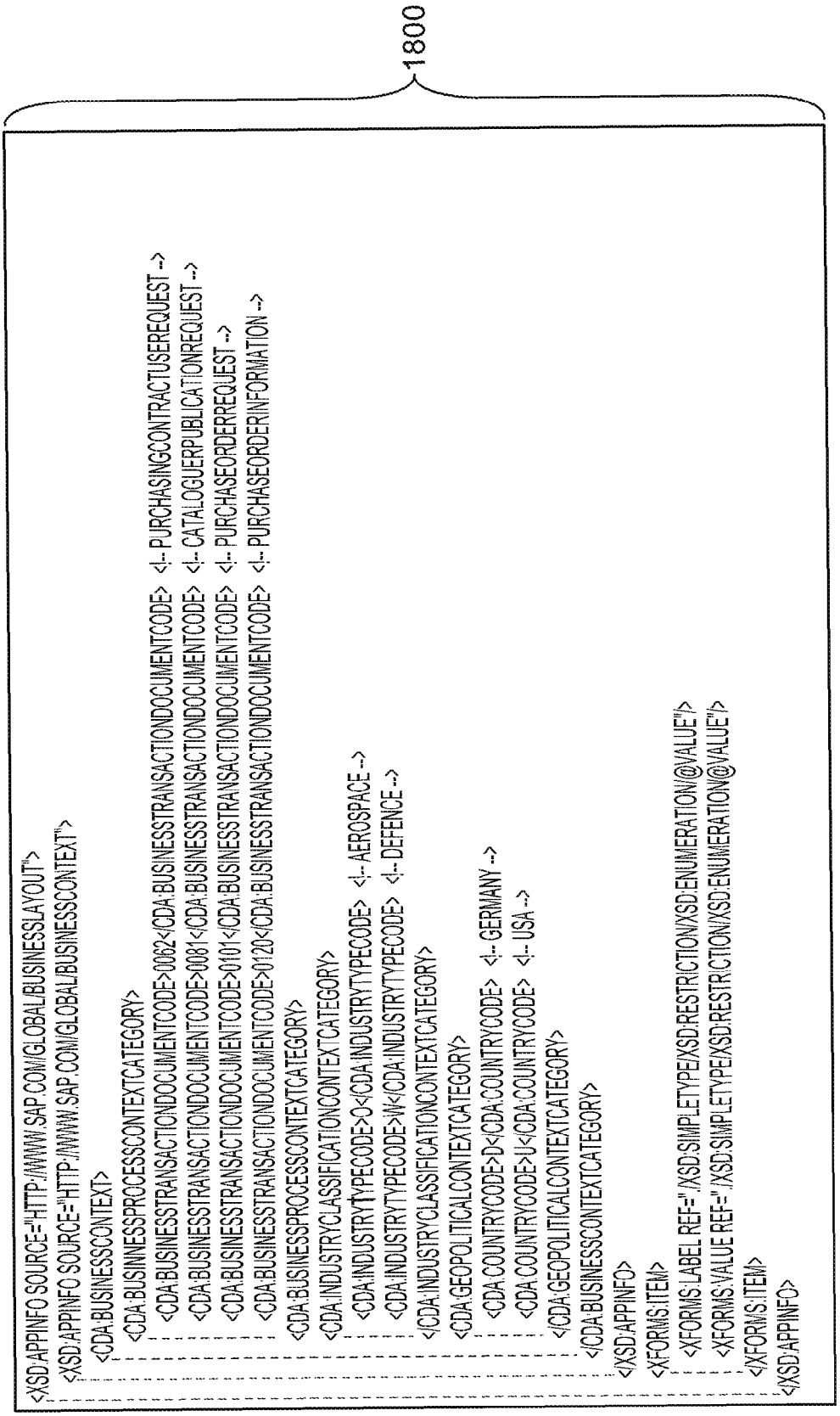
FIG. 18 shows examples of context-specific codes.

For example, FIG. 18 shows context-specific code 1800 that can be used for a data structure definition to render it context-dependent. Similarly, context-specific code 1802 can be used for the layout information to render it context-dependent. The codes 1800 and 1802 here both include the context values "0062," "0081" "0101" and "0120" for the business transaction document codes. Both of the codes 1800 and 1802 include the context values "o" and "w" for the Industry context category. Similarly, the codes 1800 and 1802 both include the context values "D" and "U" for the Geopolitical context category. Thus, the context values of the code 1802 are here the same as those in the code 1800. In another example, the layout context values can be a subset of the context values for the data structure. This means that the layout information is to be used in fewer than all of the contexts of the data structure. Another layout information can then be provided for the remaining context(s) of the data structure.

With reference again to FIG. 2, the system may include a browser 208 for handling and displaying the data elements. The browser can parse XSD artifacts of reusable building blocks and generate a GUI with the embedded relative layout information of every building block. As a particular example, the browser can perform at least the following three functions:

1. Set the current context and then load a context-specific subset of a CCTS-based XML schema with embedded layout information and represent a CCTS-based layout in a UI (web browser).

2. Load an incoming CCTS-based XML instance, select the context within the XML instance, thereafter validate it against the subset of the CCTS-based XML schema and, if the validation is correct, represent the result within the context-specific CCTS based layout shown by the UI (web browser).

3. Generate an outgoing CCTS-based XML instance from entered and validated values in the CCTS-based layout shown by an UI (web browser). Here, this generation is done according to the defined business context.

Figure 8:
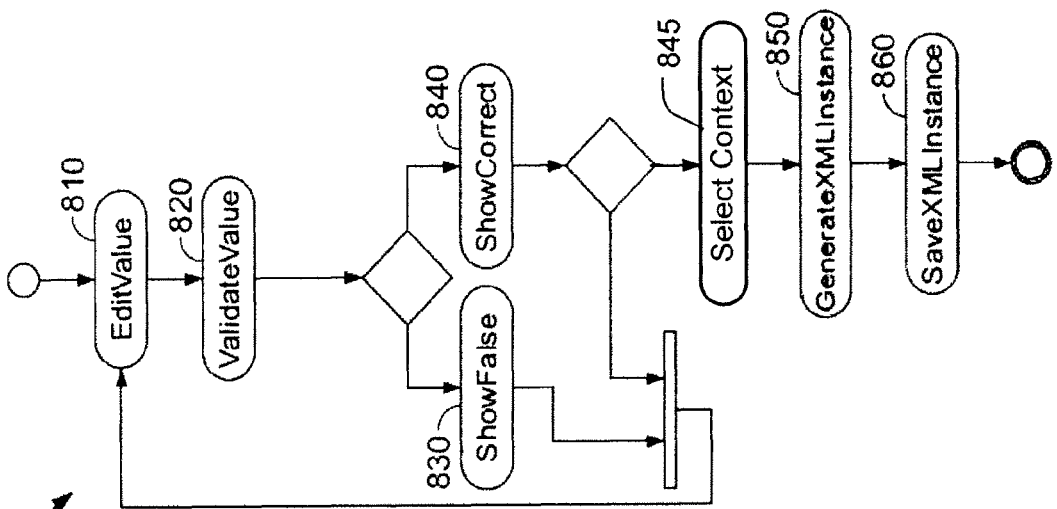
FIGS. 6-8 show embodiments of methods relating to layout information for a data element.
Figure 7:
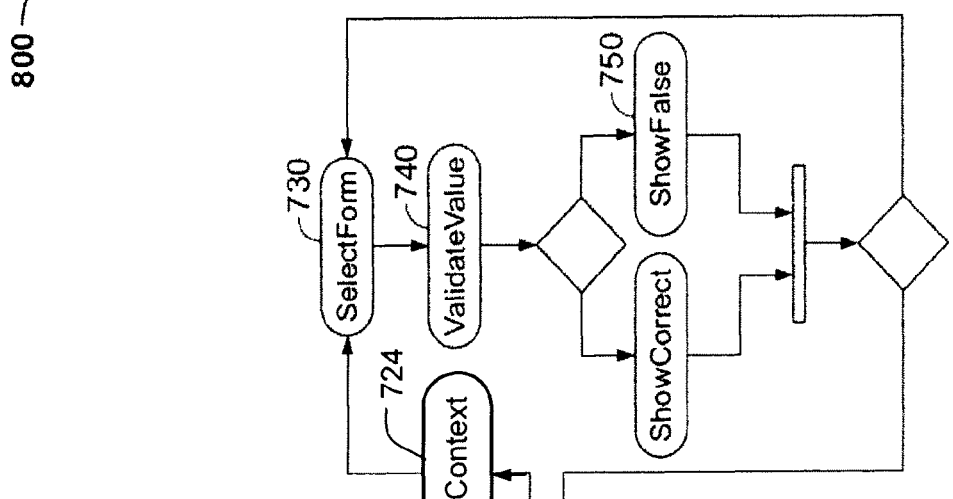
Figure 6:
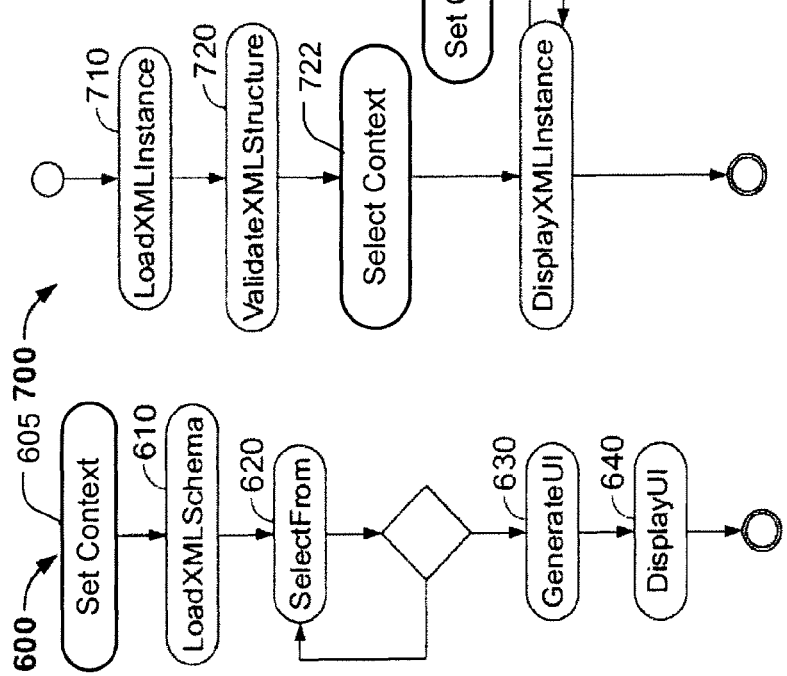

FIGS. 6-8 show examples of methods that can be performed in the handling of data elements and their associated layout information. These and other methods can be performed by a computer that executes instructions embodied in a computer-readable medium.

In FIG. 6 and method 600, the browser sets the applicable context in step 605. The browser loads and validates a CCTS based XML schema with embedded layout information in step 610. Moreover, the layout information can have context values assigned to it. The layout information may be described using (X) HTML and XFORMS. In iterative step 620, the browser selects the layout information from each XSD artifact. This selection can be made based on the context value(s) for the layout information. In step 630 the browser renders the UI layout according to the layout information of (X) HTML and XFORMS constructs and controls in the assembled XSD artifacts. After the rendering is complete, the result is shown on a UI in step 640.

The browser also can show the results of an incoming CCTS-based XML instance on the UI. In FIG. 7 and method 700, the browser loads the XML instance in step 710, and validates the same against the CCTS-based XML schema in step 720. The context is here selected from the XML instance in step 722, and that context is set in step 724 as the relevant one. The browser takes each element node of the XML instance and puts it on the appropriate layout field of the GUI, and selects the appropriate XForms controls and binds the element equivalent element values to the XForms controls for representation by the GUI. This may involve selecting, in step 730, the XForms and HTML information of the specific data element for the relevant element in the instance. This selection can be context-dependent for the data structure or the layout information, or both. In step 740, the browser validates the element value of the instance against characteristics of each qualified or unqualified data type. Based on the validation, the browser either displays the value as correct or incorrect in the specific part of the formular, according to the relevant XForms information. For example, an incorrect value may be highlighted in red in step 750.

After a user completes one or more entries in the UI, the browser can generate a CCTS-based XML instance based on the user input. In FIG. 8 and method 800, a user makes an edit in step 810. The browser performs an online validation of the value(s) in step 820 while the value is entered into specific XForms controls. If the entered value is not correct, the XForms control will be shown in an highlighted (red) color in step 830. In step 845, the browser can select the particular applicable business context for editing. Step 840 is performed if the entered value is correct (meaning that it is based on the definition of the data type). If all values are correctly entered into the UI, the browser generates a CCTS-based XML instance in step 850 and saves the same in step 860.

Figure 9:
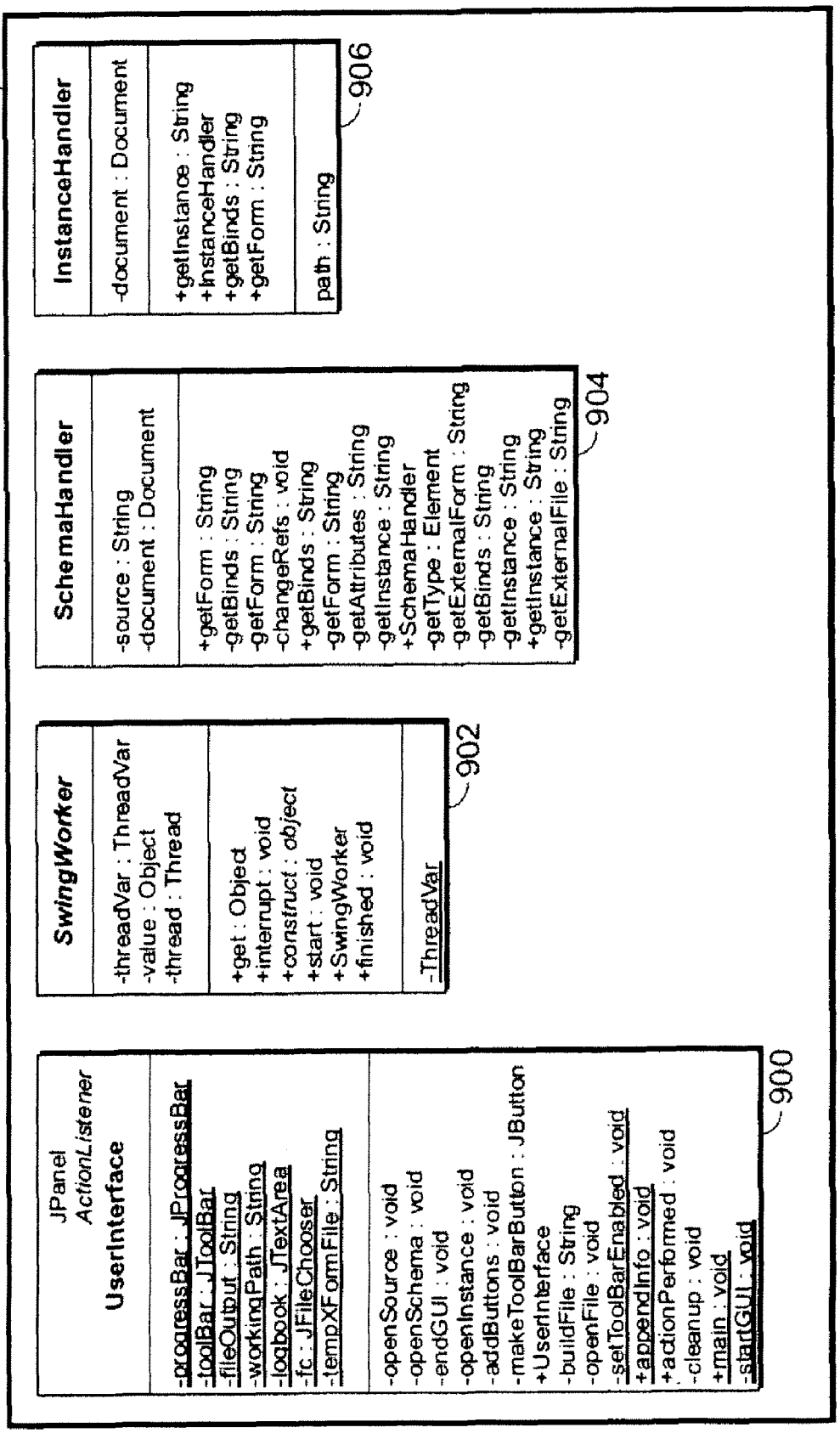
FIG. 9 schematically illustrates a data element browser.

The browser 208 is embodied in software that can be executed by the computer 110. Particularly, the browser may perform its function(s) using one or more classes, such as those schematically shown in FIG. 9. Here, a UserInterface class 900 is a GUI based on Swing, a set of program elements for Java programmers. This class offers the user methods to generate forms from XML schema documents or XML instance documents. The class also visualizes the process of parsing the documents by printing textual information. When a form is generated it is possible to display its source or to start the browser.

SwingWorker class 902 is a ready-to-use class that can be implemented to keep the application usable while parsing big documents, which can be very computing intensive. This class is available from Sun Microsystems.

A SchemaHandler class 904 offers the core methods to parse an XML schema document. To generate all necessary information (form, instance, binding), the XSD is loaded into an internal representation. The class contains several public methods, for example getter methods that perform operations on the internal document and return the desired information as a string.

In particular, the schema handler class may include a get-Form( )method that gets the form information as a string representation from the document. This may involve searching a root element. Once it is found, an overloaded getForm( ) may be called with the element as parameter, which methods searches for more elements recursive within the given element from the parameter. To locate the type definition within the XML schema using XPath, a helper method called get-Type( ) is used which returns the element from the document which represents the type definition to the fitting <element> element. Therein the layout information is stored. This tag provides all necessary information for building the form. Every element in the appinfo contains references to types or other elements, which must be resolved. For that, change Ref( ) may be performed on every element that getForm( ) locates.

Methods getExternalFile( ) and getExternalForm( ) are used to resolve external references which are currently needed to generate select controls from external code lists (e.g. country codes or currency codes). getExternalFile( ) resolves the namespace to a filename. This file is opened in a new schema handler instance. Needed form information is fetched with getExternalForm( ).

A changeRef( )method tries to resolve the given reference into a valid XPath expression. If any content is found behind that XPath pointer it is added to the element that contained the reference or the element is completely replaced by the new content. In addition, the reference is changed so that it will point to the form instance which is needed later to generate a fully working XForm.

A getInstance( )method does nearly the same as get Form( ). The <element> elements in the XML schema document are parsed recursive. Each time the parsing identifies a tag named by the element, its name is generated. Furthermore, a getAttributes( )method looks up all attributes that are defined in the type definition of an element.

A getBinds( ) method follows the principle of "walking" trough all <element> elements. It looks up the restriction in a type definition and generates an XForm binding from that.

An InstanceHandler class 906 loads an XML instance document into its internal representation. After that it searches for an attribute called "xsi:schemaLocation" which should be an attribute of the root element of the instance. It fetches the filename specified in there and takes a look at the instance directory if the schema is stored there. If this attribute is not found, the class tries to locate a file which is named like the root element. For example, with a root element like <test> it would search for test.xsd. However, if the root element equals <test xsi:schemaLocation="http://www.example.com example.xsd">, it will search for example.xsd.

Figure 13:
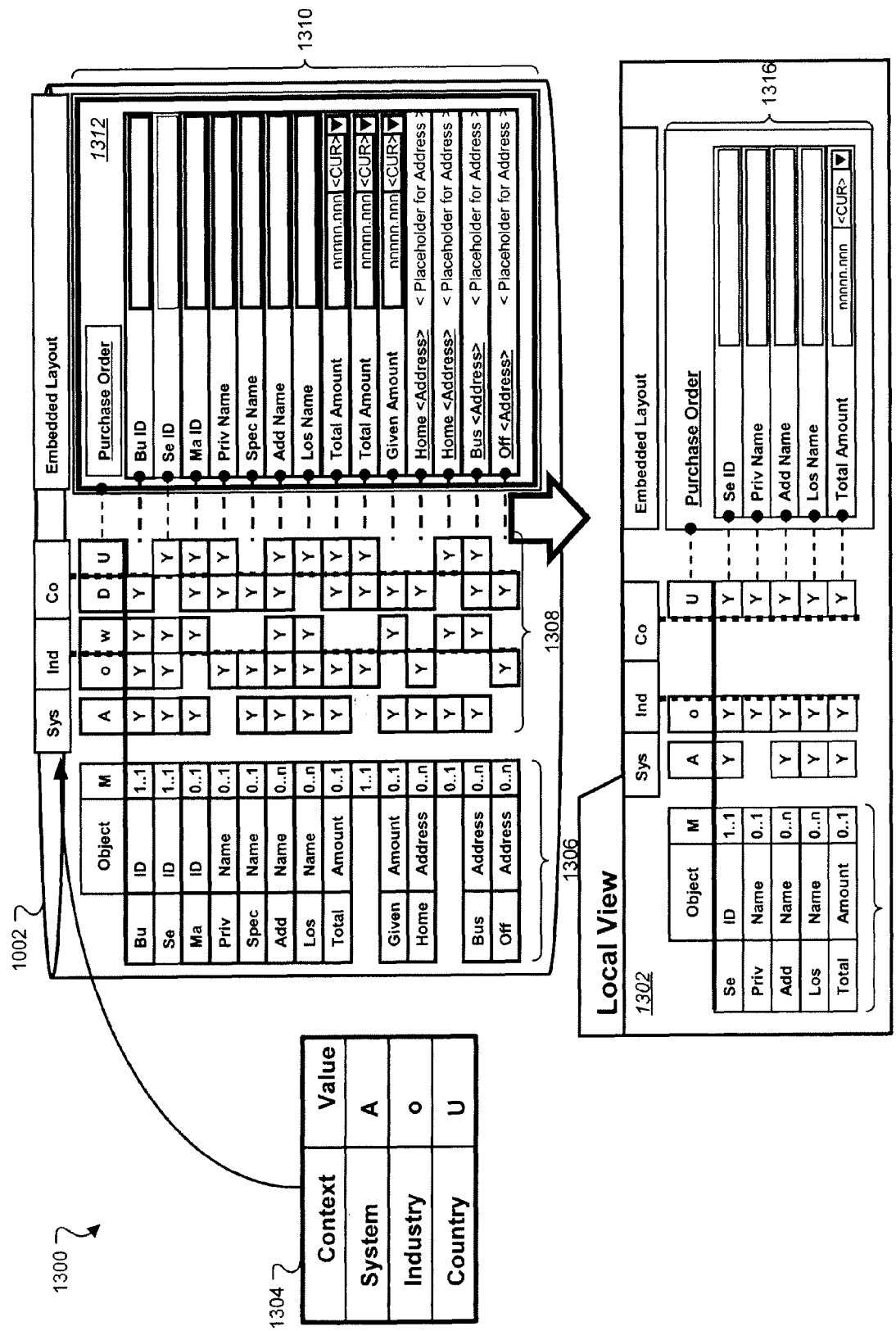
FIG. 13 schematically shows an example of a context-specific data structure and a layout in a local view.

The browser can be used with the exemplary components illustrated in FIG. 13. There, a portion of a system 1300 includes the common repository 1002, a local view 1302, and a context definition 1304. A user can use the context definition 1304 to retrieve information from the common repository 1002 to generate the local view 1302. The common repository 1002 can include data elements 1306, a categorized context 1308 for each of the data elements 1306, and an embedded layout information 1310 for each of the data elements 1306. Based on the context value(s) received, a computer system can use one or more of the data elements to generate a layout. For example, a complete layout 1312 of the data elements that considers the entire context definition 1308 is shown.

The local view 1302 includes a data element subset 1314 of the data elements 1306. The data elements 1314 are retrieved from the common repository 1002 based on a context of the local view 1302 as described by the context definition 1304. As shown, the context definition 1304 includes a value "A" in a "System" context category, a value "o" in an "Industry" context category, and a value "U" in a "Country" context category.

The local view 1302 is generated based on the context definition 1304. For example, the context definition 1304 is received. Using the context definition 1304, the data elements 1306 can be identified in the common repository 1002. In this example, the data elements 1306 having the context value "o" in the "Industry" category and the context value "U" in the "Country" category are identified using the context 1308. Using embedded layout information (e.g., the embedded layout fragments 1008, FIG. 10) of the identified data elements 1314, the user can generate a layout 1316 of the data elements for display on a GUI. Here, the layout 1316 includes a field and a label for each of the data elements, one of the fields including a drop-down menu.

Figure 14:
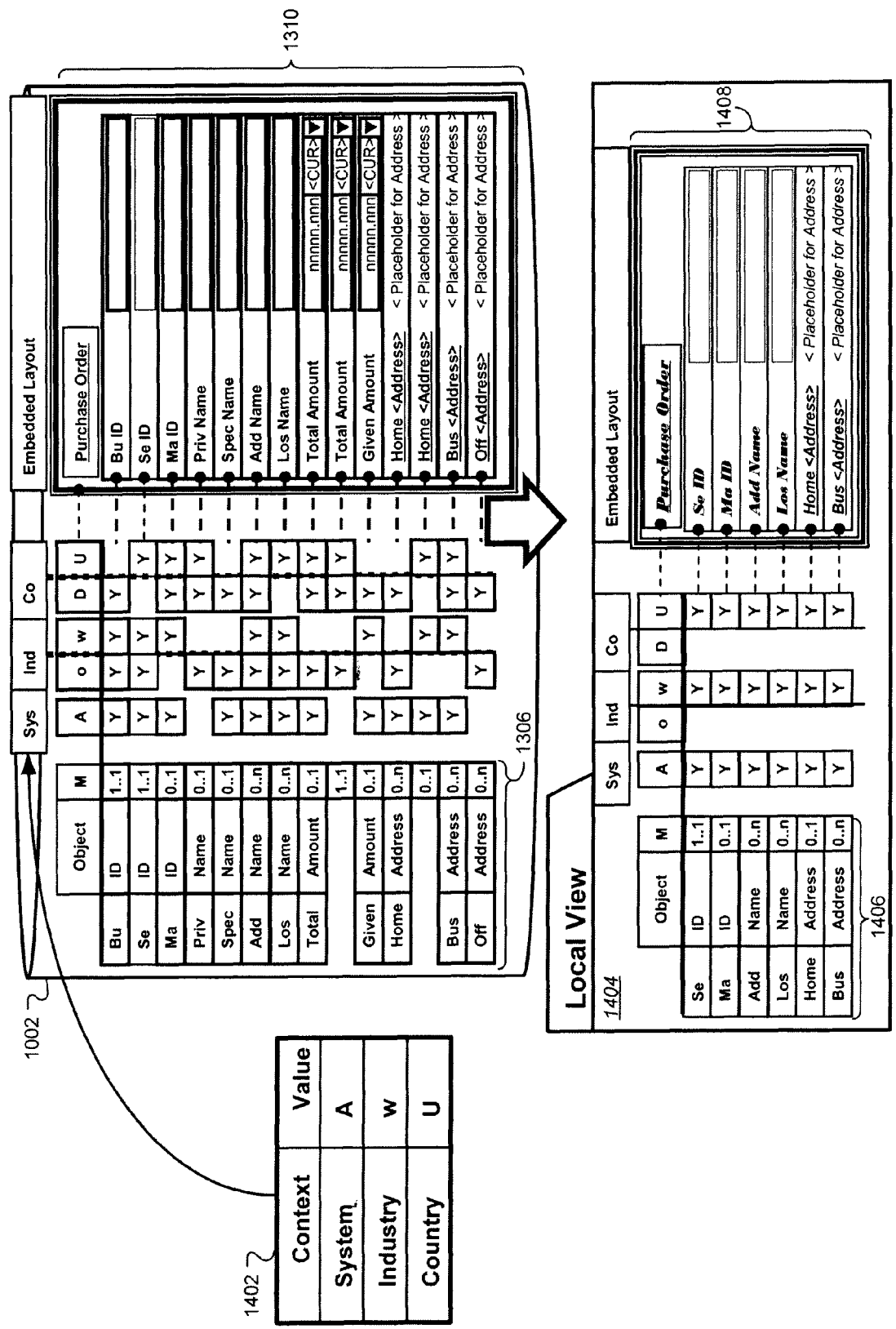
FIG. 14 schematically shows another example of a context-specific data structure and a layout in a local view.

Based on the applied context, instances with different layout can be generated for display. As shown in FIG. 14, another set of context definition 1402 can be used to generate a local view 1404. As shown, the context definition 1402 includes a value "A" in the "System" context category, a value "w" in the "Industry" context category, and a value "U" in a "Country" context category. By applying the context definition 1402, a data element subset 1406 that matches the context definition 1402 can be retrieved from the common repository 1002.

In this example, an embedded layout 1408 is generated using the data elements 1404. As shown, the layout 1408 has a style different from a style of the embedded layout 1310 (FIG. 13). In some embodiments, the common repository 1002 may generate different layouts based on the received context definition. For example, the data elements 1306 may include two sets of layout information: one set of layout information may define a display style without bold and italic text as shown in the layout 1310, and another set of layout information may define a display style with bold and italic text as shown in the layout 1408. In some embodiments, context information may be assigned to each set of the layout information. For example, the layout 1408 may be assigned to be displayed when the local view has a context value "w" in the "Industry" category, while the layout 1310 is displayed by default (e.g., when the complete layout is to be displayed that considers all contexts). Upon receiving the context definition 1402, the common repository 1002 can identify the layout 1408 as the one to be provided.

In some embodiments, the common repository 1002 can provide alternative field names based on a received context definition. For example, the data elements 1306 may include a field name associated with a context value "D" in the "Country" category. For example, when the common repository 1002 receives a context definition including the context value "D" in the "Country" category, the common repository 1002 may provide the field name instead of the preexisting name of an identified data element. As an illustrative example, suppose the common repository 1002 receives the context value "D" in the "Country" category and identifies a data element BuID to be presented. If the data element BuID includes an alternative field name "Buyer Identification" assigned to the context value "D" in the "Country" category, the common repository 1002 may then select the field name "Buyer Identifier" instead of a preexisting name "BuID" of the BuID data element to be presented in an instance of the data element.

Figure 15:
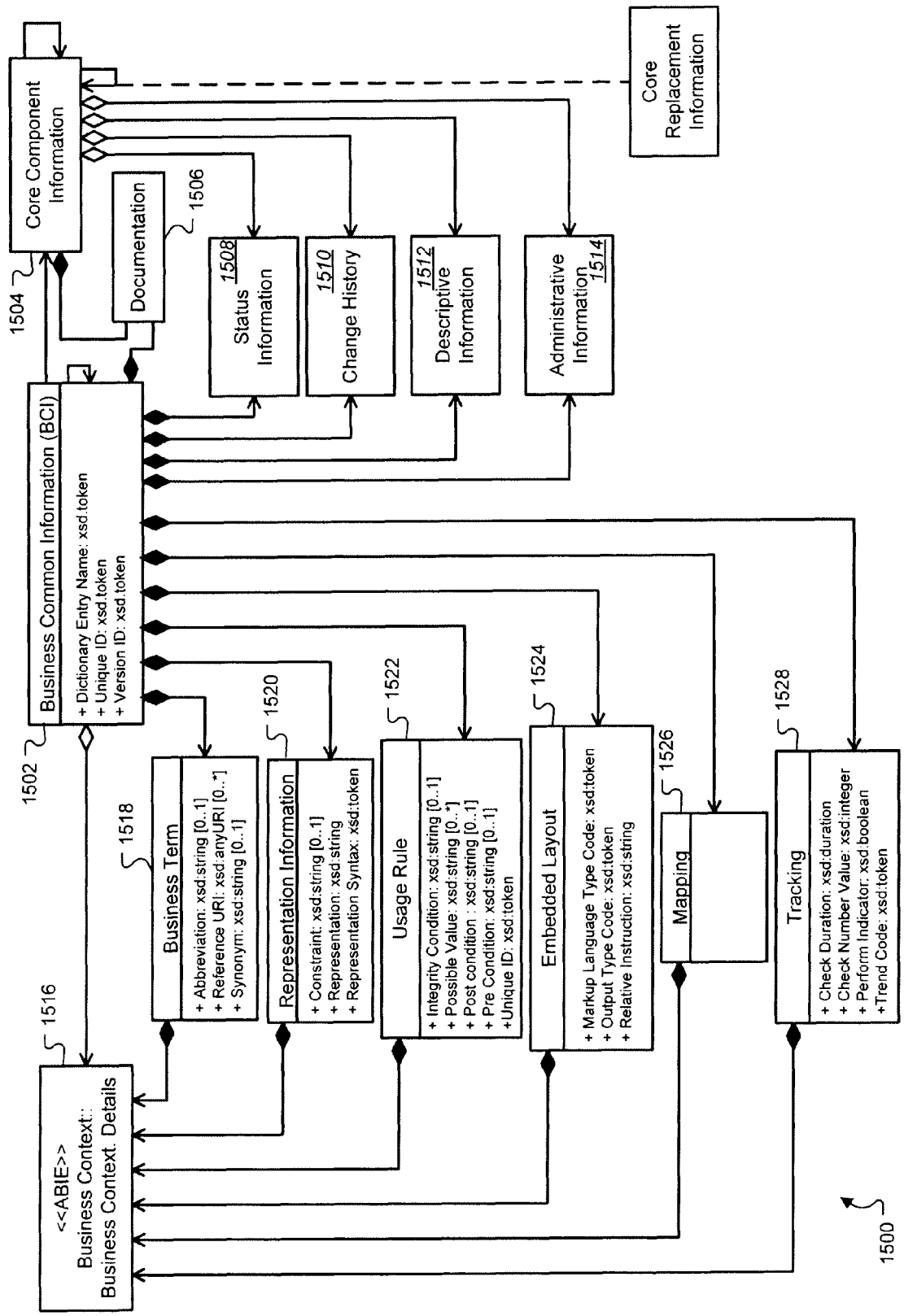
FIG. 15 shows an example of a metamodel of common information.

In some embodiments, the common repository 1002 may identify data elements by determining whether the context value does not include a specific context value. For example, a modeler may assign a context value to a data element such that the data element is not presented when a context definition of the local view includes the context value. The context-dependent layout and/or data structure can be implemented based on a model that takes in to account a context of the data structure. FIG. 15 shows an example of a metamodel 1500 for common information of, for example, a business data structure. The metamodel 1500 includes a Business Common Information (BCI) node 1502 that may be stored in the common repository 1002 (FIGS. 10, 13, 14). The BCI node 1502 includes a dictionary entry name that can describe a meaning or a function of the BCI node 1502. The BCI node 1502 is based on a core element information node 1504 and can receive a business documentation from a documentation node 1506, a business status information from a status node 1508, a business change history from a change history node 1510, a business descriptive information from a descriptive information node 1512, and a business administrative information from an administrative information node 1514.

The BCI node 1502 is associated with at least a business context ABIE 1516. For example, the business context ABIE 1516 can be used to set a business context of the BCI node 1502. The business context ABIE 1516 also provides the business context to a business terms node 1518, a representation information node 1520, a usage rule node 1522, an embedded layout node 1524, a mapping node 1526, and a tracking node 1528.

The business terms node 1518 can be used to define business terms that may be categorized by the business context provided by the business context ABIE 1516. For example, the business terms node 1518 may include a business term "SeID" and a business term "Seller Identification". As an illustrative example, the business term "Seller Identification" may be categorized to be used in a context with the context value "D" in the "Industry" category, and the business term "SeID" may be categorized in contexts without the context value "D" in the "Industry" category. In some embodiments, the BCI node 1502 may select different business terms for the same data elements based on the business context set by the business context ABIE 1516.

The embedded layout node 1524 can be used to define embedded layout information that may be specific to a particular business context provided by the business context ABIE 1516. For example, the embedded layout node 1524 may include more than one embedded layout, each embedded layout are assigned a context value. Depending on the business context provided by the business context ABIE 1516, the BCI node 1502 may select an embedded layout that has the context value matching the provided business context.

Figure 16:
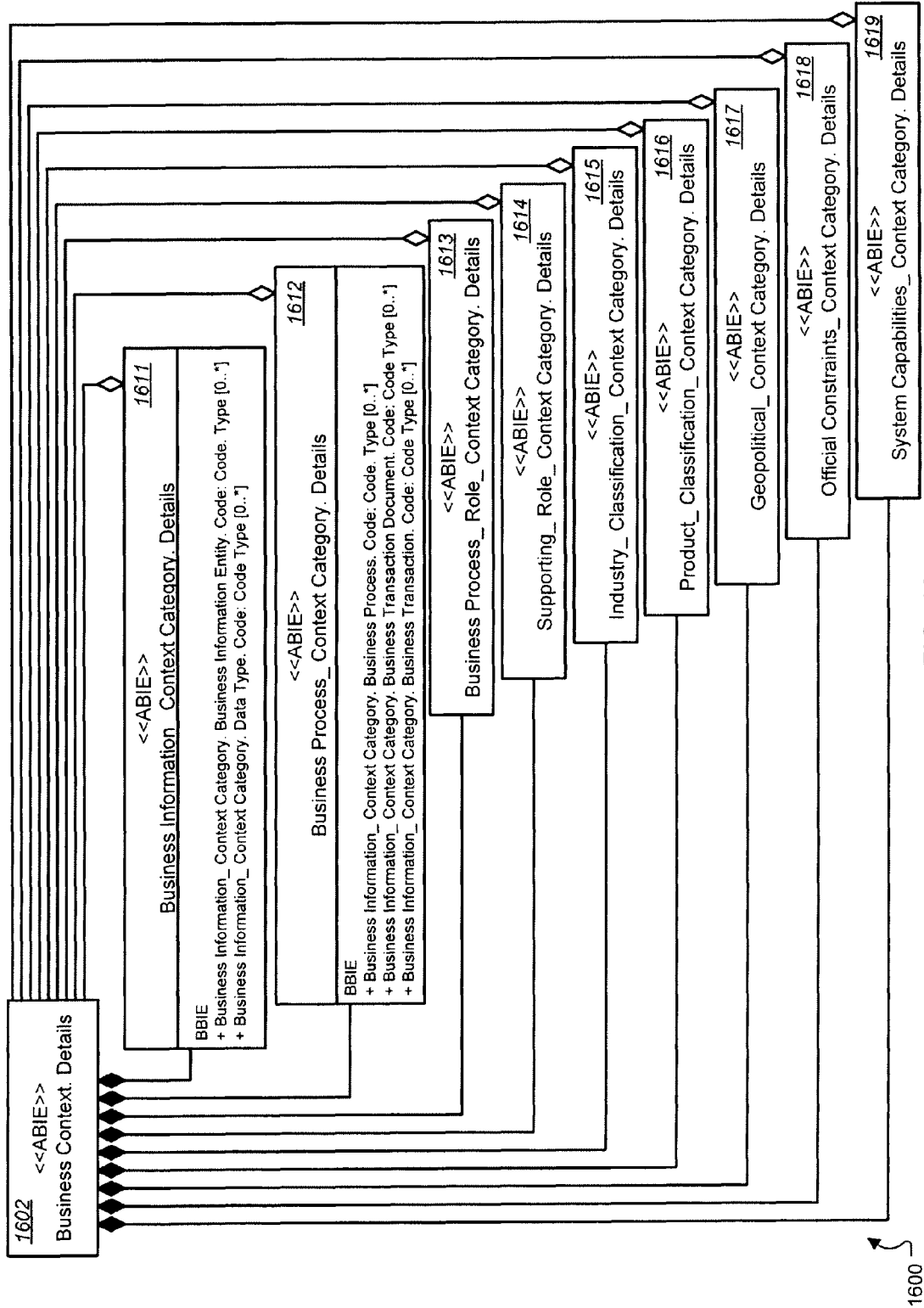
FIG. 16 shows an example of a metamodel of a business context data element including business context categories.

The business context ABIE 1516 can provide classification of context values in one or more predefined context categories, such as those used in CCTS. FIG. 16 shows an example of a metamodel 1600 for a business context 1602. A business context can have at least one business context category. In this example, the business context 1602 has a business information context category 1611, a business process context category 1612, a business process role context category 1613, a supporting role context category 1614, an industry classification context category 1615, a product classification context category 1616, a geopolitical context category 1617, an official constraints context category 1618, and a system capabilities context category 1619. Any or all of the categories 1611-1619 can be implemented as an ABIE.

Each of the context categories 1611-1619 can be used to render layout and/or data structure that is context dependent. For example, a data element or a layout information can be assigned a context value in any or all of the context categories 1611-1619 to restrict the use of the data element or the layout information. In some embodiments, assigning a context to one of the context categories 1611-1619 means that the layout information can be used for contexts that have that context value in the corresponding category and any value in the other context categories. For example, a layout information may be assigned a context value in the business process role context category 1613. Then, the layout information may be used when a context definition includes that business process role context value together with any or no specified value in the other context categories 1611, 1612, 1614-1619.

Figure 17:
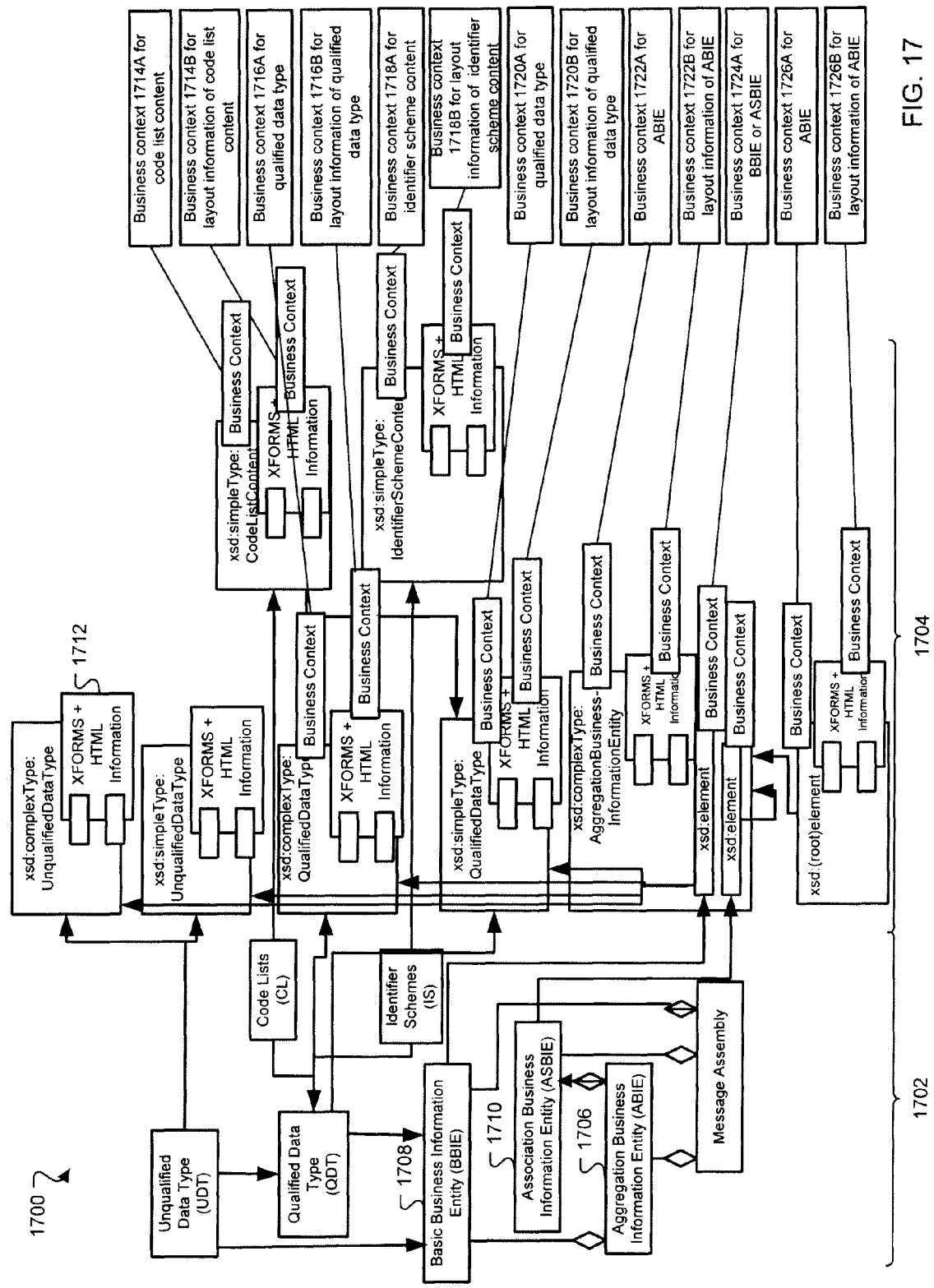
FIG. 17 schematically illustrates an exemplary data flow of a metamodel including embedded layout information.

FIG. 17 schematically shows an example data flow 1700 for providing output of one or more data element with layout information. The data flow 1700 includes a metamodel 1702 for business data and schema definitions 1704 (e.g., the schema definition 202, FIG. 2) for the corresponding data element.

The metamodel 1702 includes data elements, such as an ABIE 1706, a BBIE 1708, and an ASBIE 1710. In this example, each of the schema definitions 1704 includes at least one layout information 1712 (e.g., the layout information 204, FIG. 2). The schema definitions 1704 may include executable code for data processing. The layout information 1712 here includes XFORMS and HTML information. The data structure is here defined using xsd as being either a simple or complex type.

In some embodiments, each of the schema definitions 1704 and the layout information 1712 can be context specific. Each of the data elements 1704 and the layout information 1712 can be assigned at least one context value of a specific context category to define in which context does this information be relevant. For example, the layout context value(s) can be a subset of those for the data structures.

Here, there is provided a business context 1714A for code list content. A business context 1714B is provided for layout information of code list content. There is provided a business context 1716A for qualified data type. There is provided a business context 1716B for layout information of qualified data type. There is provided a business context 1718A for identifier scheme content. There is provided a business context 1718B for layout information of identifier scheme content. There is provided a business context 1720A for qualified data type. There is provided a business context 1720B for layout information of qualified data type. There is provided a business context 1722A for ABIE. There is provided a business context 1722B for layout information of ABIE. There is provided a business context 1724A for BBIE or ASBIE. There is provided a business context 1724B for layout information of BBIE or ASBIE. There is provided a business context 1726A for ABIE. There is provided a business context 1726B for layout information of ABIE.

Figure 19:
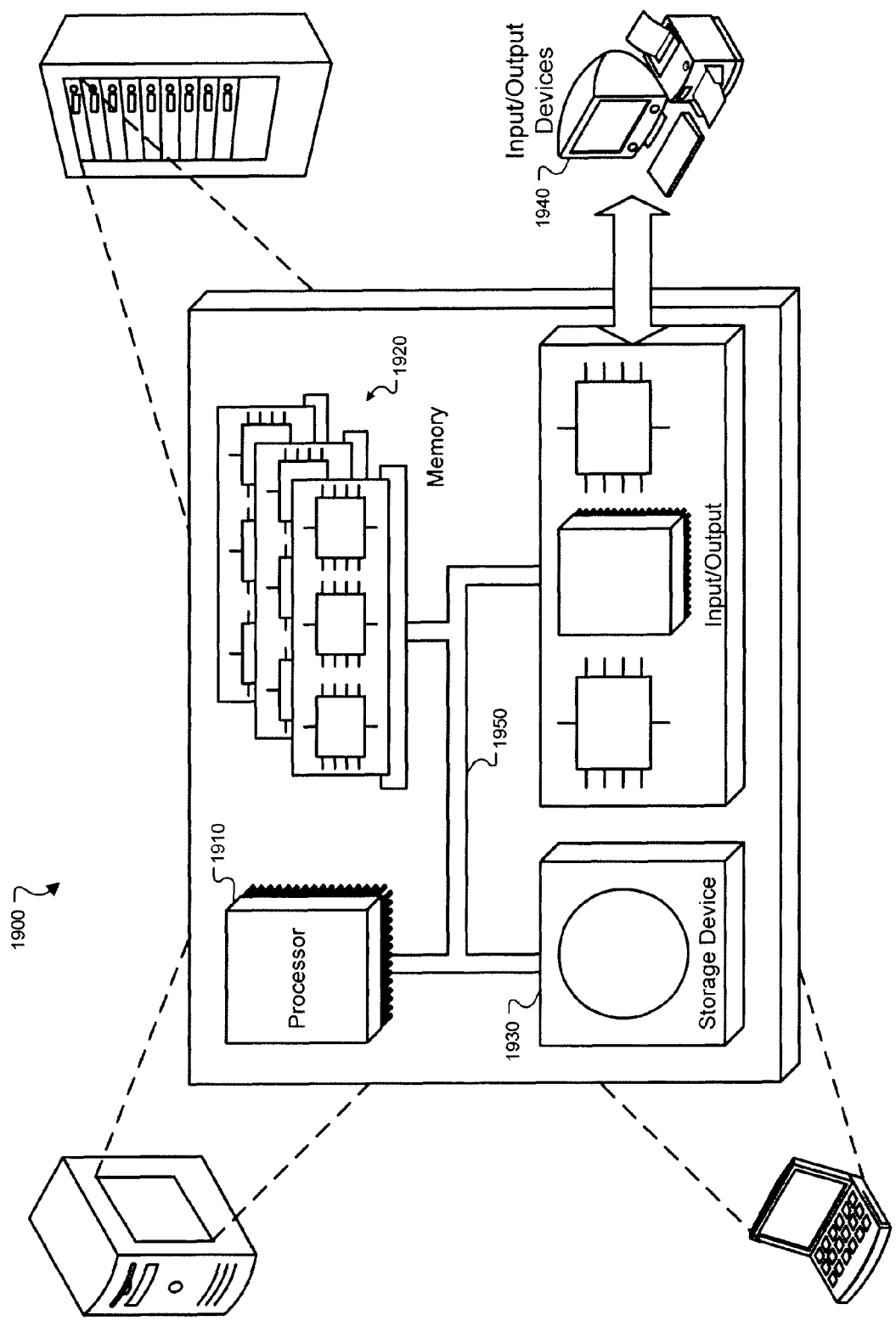
FIG. 19 is a block diagram of a computing system that can be used in connection with computer-implemented methods described in this document.

FIG. 19 is a schematic diagram of a generic computer system 1900. The system 1900 can be used for the operations described in association with any of the computer-implement methods described previously, according to one implementation. The system 1900 includes a processor 1910, a memory 1920, a storage device 1930, and an input/output device 1940. Each of the components 1910, 1920, 1930, and 1940 are interconnected using a system bus 1950. The processor 1910 is capable of processing instructions for execution within the system 1900. In one implementation, the processor 1910 is a single-threaded processor. In another implementation, the processor 1910 is a multi-threaded processor. The processor 1910 is capable of processing instructions stored in the memory 1920 or on the storage device 1930 to display graphical information for a user interface on the input/output device 1940.

The memory 1920 stores information within the system 1900. In one implementation, the memory 1920 is a computer-readable medium. In one implementation, the memory 1920 is a volatile memory unit. In another implementation, the memory 1920 is a non-volatile memory unit.

The storage device 1930 is capable of providing mass storage for the system 1900. In one implementation, the storage device 1930 is a computer-readable medium. In various different implementations, the storage device 1930 may be a floppy disk device, a hard disk device, an optical disk device, or a tape device.

The input/output device 1940 provides input/output operations for the system 1900. In one implementation, the input/output device 1940 includes a keyboard and/or pointing device. In another implementation, the input/output device 1940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method comprising:
   associating a first layout definition and a second layout definition with a schema definition, the schema definition defining a data element that is for use in identifying semantics of a data portion labeled with the data element in an electronic communication, each of the first and second layout definitions providing a different visual appearance for the data portion upon the electronic communication being displayed;
   assigning at least a first context value to the first layout definition and at least a second context value to the second layout definition, the first and second context values corresponding to possible context values in the electronic communication; and
   storing (i) the first and second layout definitions that have been associated with the schema definition, (ii) the first and second context values that have been assigned to the first and second layout definitions, and (iii) the schema definition in a repository that is configured to provide for selection of one of the first and second layout definitions whose context value matches at least one possible context value in the electronic communication, for use in providing a visual appearance for the data portion upon the electronic communication being displayed, the schema definition including at least indications of the first and second layout definitions.

2. The computer-implemented method of claim 1, further comprising:
   generating the electronic communication in accordance with the schema definition; and
   transmitting the generated electronic communication from a sending business entity to a receiving business entity.

3. The computer-implemented method of claim 1, further comprising:
   receiving, at a receiving business entity and from a sending business entity, the electronic communication, wherein the electronic communication includes (i) the data portion, and (ii) a context value; and
   interpreting the received electronic communication in accordance with the schema definition.

4. The computer-implemented method of claim 3, further comprising:
   identifying, from multiple schema definitions for different data elements, the schema definition as for the data element;
   selecting, from the schema definition and from among at least the first and second layout definitions stored for the schema definition, a layout definition to use to provide a visual appearance for displaying the data portion, the layout definition selected from at least the first and second layout definitions based on matching the context value in the received electronic communication with a context value that has been assigned to the layout definition; and
   providing a visual display of the data portion that is defined by the selected layout definition.

5. The computer-implemented method of claim 1, wherein the first and second layout definitions for the data element are alternative versions of layout definitions that are selected for displaying the data portion based on a context value that is included in the electronic communication.

6. The computer-implemented method of claim 1, wherein each of the first and second layout definitions are stored in the schema definition.

7. The computer-implemented method of claim 1, wherein the first and second context values are stored in the schema definition.

8. The computer-implemented method of claim 1, wherein the schema definition includes a structural definition for the data element.

9. The computer-implemented method of claim 1, wherein at least one of the first and second context values belongs to one of a plurality of context categories, and wherein the one context value is assigned such that the corresponding layout definition is valid for contexts that have the context value in the corresponding context category and any value in the other context categories.

10. A computer program product tangibly embodied in a computer readable medium, the computer program product including instructions that, when executed, cause a processor to perform operations comprising:
    associating a first layout definition and a second layout definition with a schema definition, the schema definition defining a data element that is for use in identifying semantics of a data portion labeled with the data element in an electronic communication, each of the first and second layout definitions providing a different visual appearance for the data portion upon the electronic communication being displayed;
    assigning at least a first context value to the first layout definition and at least a second context value to the second layout definition, the first and second context values corresponding to possible context values in the electronic communication; and
    storing (i) the first and second layout definitions that have been associated with the schema definition, (ii) the first and second context values that have been assigned to the first and second layout definitions, and (iii) the schema definition in a repository that is configured to provide for selection of one of the first and second layout definitions whose context value matches at least one possible context value in the electronic communication context of the electronic communication, for use in providing a visual appearance for the data portion upon the electronic communication being displayed, the schema definition including at least indications of the first and second layout definitions.

11. The computer program product claim 10, wherein the operations further comprise:
    generating the electronic communication in accordance with the schema definition; and
    transmitting the generated electronic communication from a sending business entity to a receiving business entity.

12. The computer program product of claim 10, further comprising:
    receiving, at a receiving business entity and from a sending business entity, the electronic communication, wherein the electronic communication includes (i) the data portion, and (ii) a context value; and interpreting the received electronic communication in accordance with the schema definition.

13. The computer program product of claim 12, wherein the operations further comprise:

identifying, from multiple schema definitions for different data elements, the schema definition as for the data element;

selecting, from the schema definition and from among at least the first and second layout definitions stored for the schema definition, a layout definition to use to provide a visual appearance for displaying the data portion, the layout definition selected from at least the first and second layout definitions based on matching the context value in the received electronic communication with a context value that has been assigned to the layout definition; and providing a visual display of the data portion that is defined by the selected layout definition.

14. The computer program product of claim 10, wherein the first and second layout definitions for the data element are alternative versions of layout definitions that are selected for displaying the data portion based on a context value that is included in the electronic communication.

15. The computer program product of claim 10, wherein each of the first and second layout definitions are stored in the schema definition.

16. The computer program product of claim 10, wherein the first and second context values are stored in the schema definition.

17. The computer program product of claim 10, wherein the schema definition includes a structural definition for the data element.

18. The computer program product of claim 10, wherein at least one of the first and second context values belongs to one of a plurality of context categories, and wherein the one context value is assigned such that the corresponding layout definition is valid for contexts that have the context value in the corresponding context category and any value in the other context categories.

19. A system comprising:

a computer readable medium comprising instructions;

at least one programmable processor coupled to the computer readable medium configured to execute the instructions to perform operations comprising:

associating a first layout definition and a second layout definition with a schema definition, the schema definition defining a data element that is for use in identifying semantics of a data portion labeled with the data element in an electronic communication, each of the first and second layout definitions providing a different visual appearance for the data portion upon the electronic communication being displayed;

assigning at least a first context value to the first layout definition and at least a second context value to the second layout definition, the first and second context values corresponding to possible context values in the electronic communication; and storing (i) the first and second layout definitions that have been associated with the schema definition, and (ii) the first and second context values that have been assigned to the first and second layout definitions, and (iii) the schema definition in a repository that is configured to provide for selection of one of the first and second layout definitions whose context value matches at least one possible context value in the electronic communication, for use in providing a visual appearance for the data portion upon the electronic communication being displayed, the schema definition including at least indications of the first and second layout definitions.

* * * * *